United States Patent
Jeong et al.

(10) Patent No.: US 9,653,939 B2
(45) Date of Patent: May 16, 2017

(54) NON-CONTACT TYPE POWER CHARGING APPARATUS

(71) Applicant: SAMSUNG ELECTRO-MECHANICS CO., LTD., Suwon-Si (KR)

(72) Inventors: In Wha Jeong, Suwon-Si (KR); Hyung Jin Im, Suwon-Si (KR); Hugh Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/612,223

(22) Filed: Feb. 2, 2015

(65) Prior Publication Data
US 2016/0079792 A1    Mar. 17, 2016

(30) Foreign Application Priority Data
Sep. 11, 2014  (KR) .................. 10-2014-0120454

(51) Int. Cl.
*H02J 7/02*     (2016.01)
*H01F 38/14*    (2006.01)
(Continued)

(52) U.S. Cl.
CPC .............. *H02J 7/025* (2013.01); *H01F 38/14* (2013.01); *H02J 7/0042* (2013.01); *H02J 50/40* (2016.02)

(58) Field of Classification Search
CPC .... H02J 7/025; H02J 5/005; H02J 7/00; H02J 2007/0001; H02J 7/0021; H04B 5/0037;
(Continued)

(56) References Cited

U.S. PATENT DOCUMENTS 6,100,663 A * 8/2000 Boys ................ B60L 11/182
                                                 320/108
9,165,708 B2 * 10/2015 Lim .................. H01F 27/2804
(Continued)

FOREIGN PATENT DOCUMENTS

JP    2010-200594 A    9/2010
JP    2012-039815 A    2/2012
(Continued)

OTHER PUBLICATIONS

Korean Office Action issued on Jan. 25, 2016 in counterpart Korean Patent Application No. 10-2014-0120454 (7 pages in English; 5 pages in Korean).

*Primary Examiner* — Nizar Sivji
(74) *Attorney, Agent, or Firm* — NSIP Law

(57) ABSTRACT

A non-contact type power charging apparatus may include a plurality of power transmitting coils transmitting power in a non-contact scheme, a plurality of switching units connected to the power transmitting coils, respectively, to switch the power transmitted through corresponding power transmitting coils, and a switching controlling unit controlling power switching of the switching units depending on coupling coefficients between each of the power transmitting coils and at least one power receiving coil of a plurality of battery apparatuses. The battery apparatuses may have at least one power receiving coil receiving the power from the power transmitting coils to charge the power in at least one battery cell.

11 Claims, 28 Drawing Sheets

(51) Int. Cl.
*H02J 7/00* (2006.01)
*H02J 50/40* (2016.01)

(58) Field of Classification Search
CPC .. H04B 5/0093; H04B 5/0075; H04B 5/0087; H01M 10/44; H01M 10/46; H01F 38/14
See application file for complete search history.

(56) References Cited

U.S. PATENT DOCUMENTS

| | | | |
|---|---|---|---|
| 2010/0187912 A1 | 7/2010 | Kitamura et al. | |
| 2011/0025265 A1* | 2/2011 | Mochida | G06K 19/0701 320/108 |
| 2011/0260532 A1* | 10/2011 | Tanabe | H01M 10/44 307/17 |
| 2012/0098486 A1* | 4/2012 | Jung | H02J 7/025 320/108 |
| 2012/0235508 A1* | 9/2012 | Ichikawa | H02J 7/0021 307/104 |
| 2013/0020988 A1* | 1/2013 | Kim | H02J 7/0013 320/108 |
| 2013/0038272 A1* | 2/2013 | Sagata | B60L 11/182 320/106 |
| 2013/0127405 A1* | 5/2013 | Scherer | H02J 7/025 320/108 |
| 2013/0221913 A1* | 8/2013 | Kim | H02J 7/0042 320/108 |
| 2013/0300204 A1* | 11/2013 | Partovi | H01F 38/14 307/104 |
| 2013/0307474 A1* | 11/2013 | Shimura | H01M 10/46 320/108 |
| 2014/0070765 A1* | 3/2014 | Hasegawa | H01M 10/46 320/108 |
| 2014/0117930 A1* | 5/2014 | Imazu | H02J 5/005 320/108 |

FOREIGN PATENT DOCUMENTS

| | | |
|---|---|---|
| KR | 10-0836631 | 6/2008 |
| KR | 10-2013-0054897 A | 5/2013 |
| KR | 10-2013-0099699 A | 9/2013 |

* cited by examiner

Before

After

Before

After

| Tx1 | Tx2 |
|---|---|
| on | off |
| off | on |

FIG. 8A

| Tx1 | Tx2 |
|---|---|
| FIXED | VARIED |
| VARIED | FIXED |

FIG. 8B

NON-CONTACT TYPE POWER CHARGING APPARATUS

CROSS-REFERENCE TO RELATED APPLICATION

This application claims the priority and benefit of Korean Patent Application No. 10-2014-0120454 filed on Sep. 11, 2014, with the Korean Intellectual Property Office, the disclosure of which is incorporated in its entirety herein by reference.

BACKGROUND

Some embodiments of the present disclosure may relate to a non-contact type power charging apparatus capable of charging a battery cell with power in a non-contact scheme.

An electronic apparatus is operated using electricity as an energy source.

Electrical power as an energy source needs to be supplied to an electronic apparatus in order for the electronic apparatus to be operated. The electronic apparatus may receive or generate power via self-generation thereof, or receive externally supplied power.

In order for the electronic apparatus to receive the power supplied from an external source, a power supplying apparatus may be needed for transferring power from an externally-supplied power outlet to the electronic apparatus.

As the power supplying apparatus, a contact type power supplying apparatus directly connected to the electronic apparatus by a connector, or the like, is commonly used to supply the power to a battery embedded in the electronic apparatus. Alternatively, the power may be supplied to the battery embedded in the electronic apparatus in a non-contact scheme.

RELATED ART DOCUMENT (Patent Document 1) Korean Patent Laid-Open Publication No. 10-2013-0054897

SUMMARY

An aspect of the present disclosure may provide a non-contact type power charging apparatus capable of controlling charging voltages charged in each of a plurality of battery apparatuses in a non-contact scheme depending on a coupling coefficient between a power transmitting coil and a power receiving coil.

According to an aspect of the present disclosure, a non-contact type power charging apparatus may include: a plurality of power transmitting coils transmitting power in a non-contact scheme; a plurality of switching units connected to the plurality of power transmitting coils, respectively, to switch the power transmitted through corresponding power transmitting coils; and a switching controlling unit controlling power switching of the switching units depending on coupling coefficients between each of the power transmitting coils and at least one power receiving coil of a plurality of battery apparatuses. The battery apparatuses may have at least one power receiving coil receiving the power from the plurality of power transmitting coils to charge the power in at least one battery cell.

According to another aspect of the present disclosure, a non-contact type power charging apparatus may include: a plurality of power transmitting units each including a power unit supplying a direct current (DC) voltage, a switching unit switching the DC voltage from the power unit, a power transmitting coil transmitting power in a non-contact scheme depending on power switching of the switching unit, a detecting unit detecting power state variations of the power transmitting coil, and a controlling unit controlling the power switching of the switching unit by setting a coupling coefficient between the power transmitting coil and a power receiving coil depending on a detection result of the detecting unit. The plurality of power transmitting units may control transmission power depending on coupling coefficients between power transmitting coils of each of the plurality of power transmitting units and at least one power receiving coil of a plurality of battery apparatuses. The battery apparatuses may have at least one power receiving coil receiving the power from the power transmitting coils to charge the power in at least one battery cell.

BRIEF DESCRIPTION OF DRAWINGS

The above and other aspects, features and other advantages of the present disclosure will be more clearly understood from the following detailed description taken in conjunction with the accompanying drawings, in which:

FIGS. 6A through 6D, FIGS. 7A through 7D, and FIGS. 8A and 8B are views illustrating examples of a power charging operation according to exemplary embodiments of the present disclosure;

DETAILED DESCRIPTION

Figure 1A:
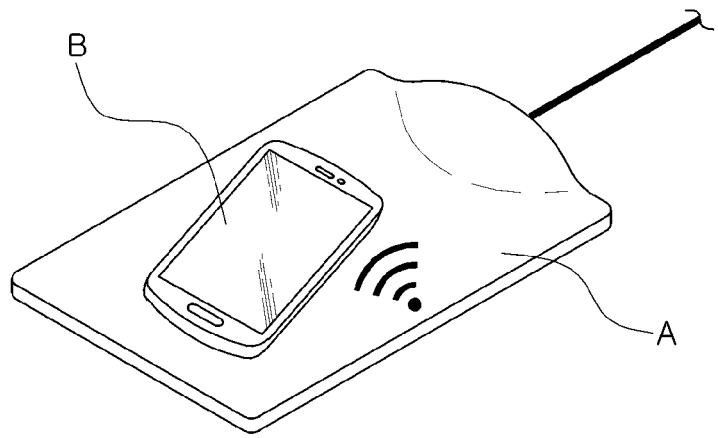
FIGS. 1A and 1B are views illustrating applications of a power charging apparatus according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1B:
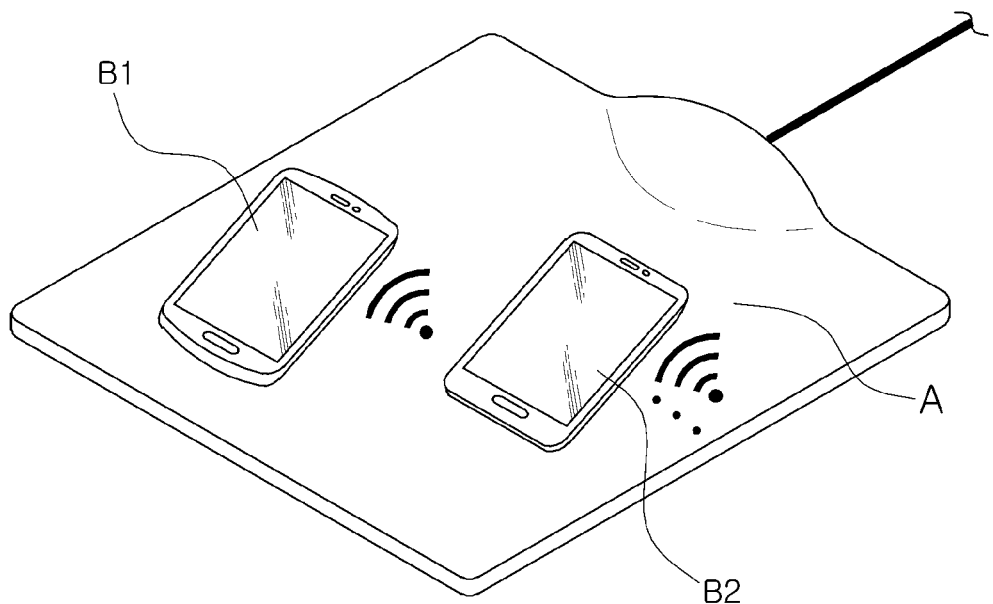

FIGS. 1A and 1B are views illustrating applications of a power charging apparatus according to an exemplary embodiment of the present disclosure.

Referring to FIGS. 1A and 1B, a power charging apparatus A according to an exemplary embodiment of the present disclosure may transmit power to one or more electronic devices, such as, a cellular phone, a tablet personal computer (PC), a laptop PC, or the like, including a battery apparatus B having a plurality of battery cells, in a non-contact scheme. In addition, the power charging apparatus A according to the exemplary embodiment of the present disclosure may transmit power to each of a plurality of cellular phones, tablet PCs, laptop PCs, or the like, having battery apparatuses B1 and B2 in the non-contact scheme (here, the non-contact scheme may mean, for example, but not limited to, a scheme in which a direct connection is not made between conductors of a transmit side and a receive side in a process of transmitting power from the transmit side to the receive side, and may be called a contactless scheme, a wireless transmitting scheme, or the like).

Figure 2A:
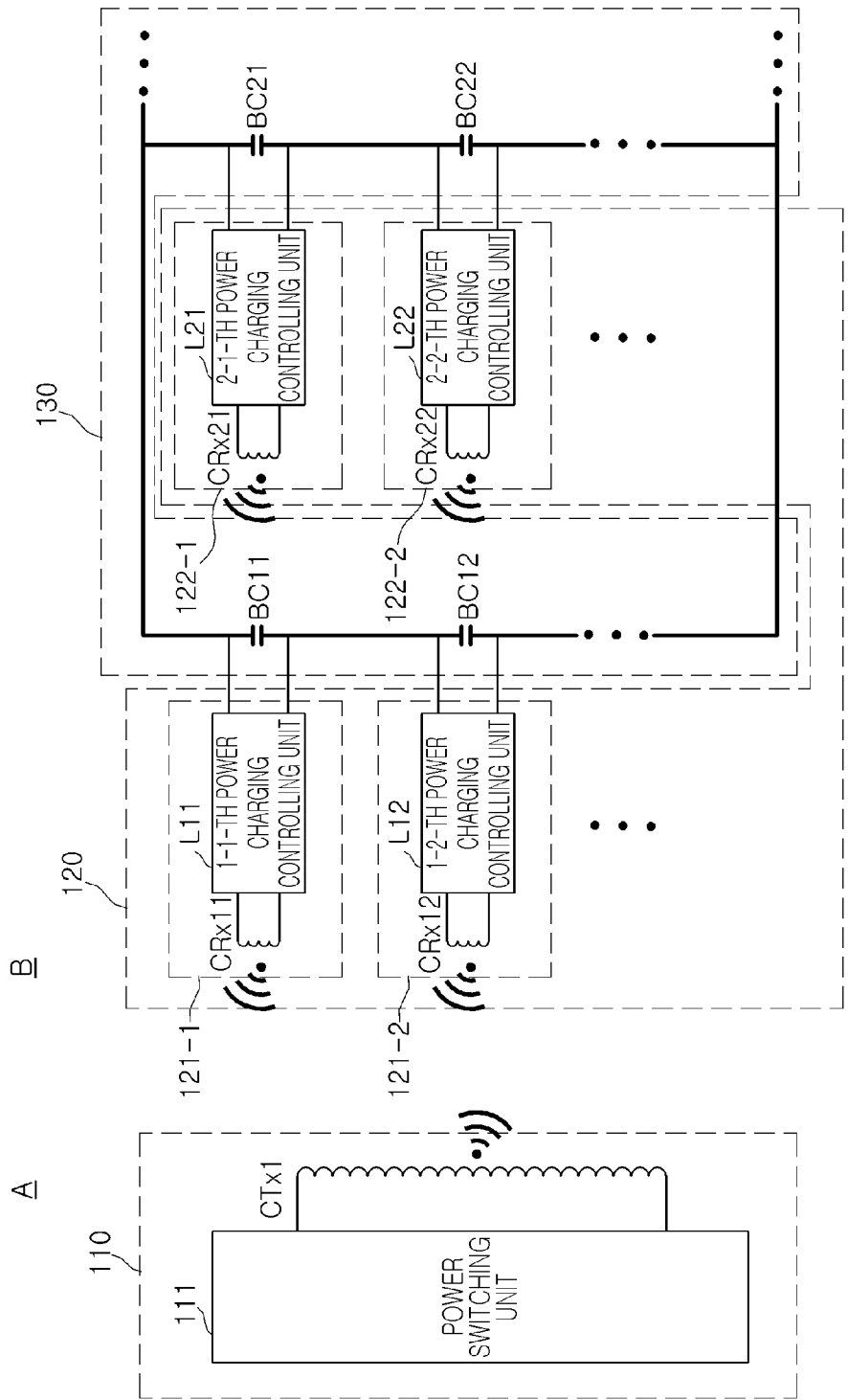
FIGS. 2A and 2B are circuit diagrams schematically illustrating examples of a power charging apparatus and a battery apparatus according to exemplary embodiments of the present disclosure.
Figure 2B:
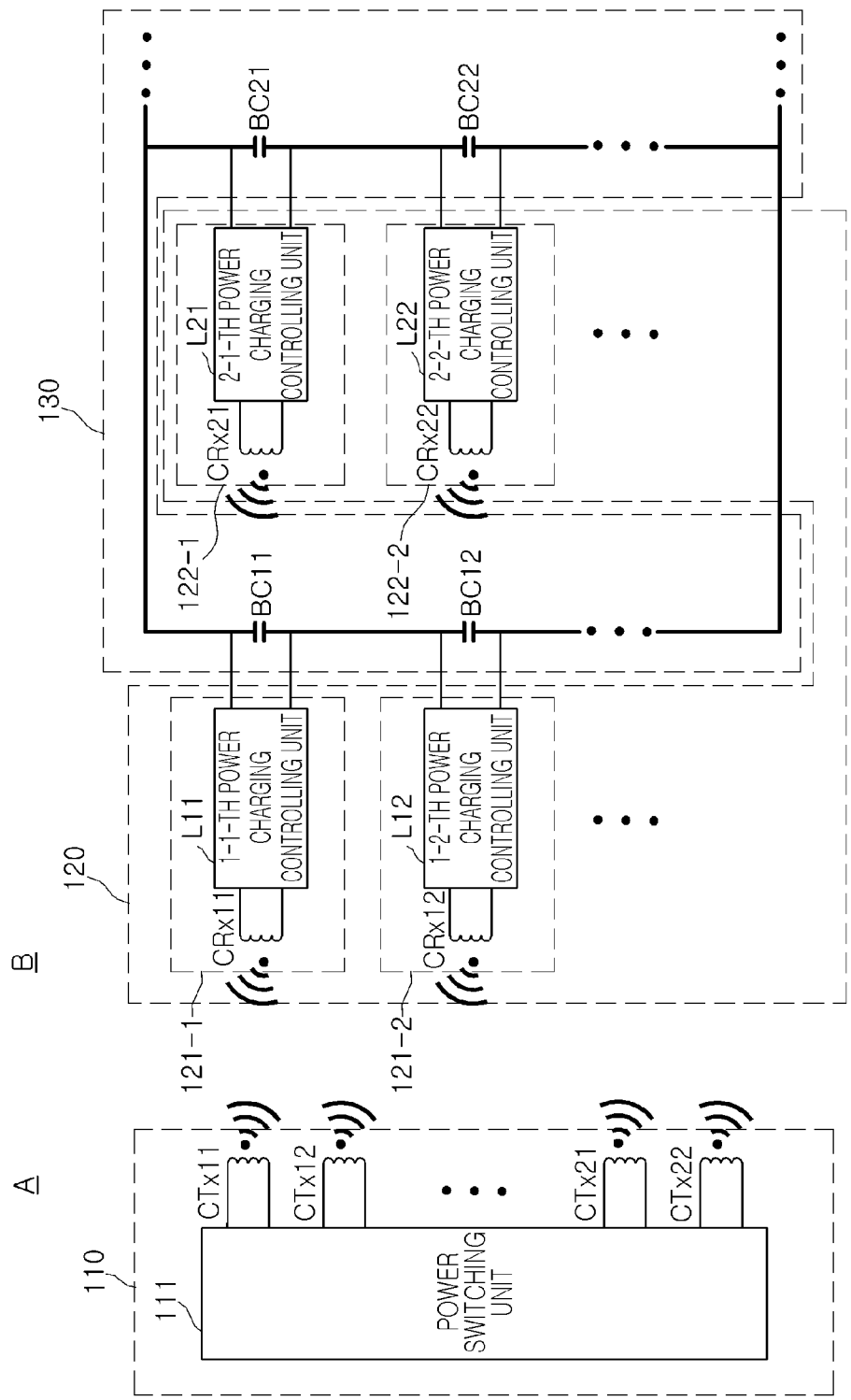

FIGS. 2A and 2B are circuit diagrams schematically illustrating examples of a power charging apparatus and a battery apparatus according to an exemplary embodiment of the present disclosure.

Referring to FIGS. 2A and 2B, the power charging apparatus A according to the exemplary embodiment of the present disclosure may include a power supplying unit 110 transmitting power in the non-contact scheme. The power supplying unit 110 may include a power switching unit 111 providing preset power and power transmitting coils CTx1, CTx11, CTx12, CTx21, and CTx22 transmitting the power from the power switching unit 111 in the non-contact scheme.

The power charging apparatus A may include one power transmitting coil CTx1 as shown in FIG. 2A or include a plurality of power transmitting coils CTx11, CTx12, . . . , CTx21, and CTx22 as shown in FIG. 2B in order to improve power transmission efficiency, The number of the power transmitting coils CTx11, CTx12, . . . , CTx21, and CTx22 may correspond to that of power receiving coils CRx11, CRx12, . . . , CRx21, and CRx22 disposed at a power receiving side.

Referring to FIGS. 2A and 2B, the battery apparatus B may include a power charging unit 120 and a battery unit 130. The power charging unit 120 may include a plurality of power charging units 121-1, 121-2, 122-1, and 122-2 corresponding to a plurality of battery cells BC11, BC12, BC21, and BC22 of the battery unit 130 in a one-to-one scheme, and the plurality of power charging units 121-1, 121-2, 122-1, and 122-2 may include power receiving coils CRx11, CRx12, CRx21, and CRx22 and power charging controlling units L11, L12, L21, and L22, respectively, in order to charge power in corresponding battery cells BC11, BC12, BC21, and BC22.

The power receiving coils CRx11, CRx12, CRx21, and CRx22 may receive the power from the power transmitting coils CTx1, CTx11, CTx12, . . . , CTx21, and CTx22 of the power charging apparatus A in the non-contact scheme, and the power charging controlling units L11, L12, L21, and L22 may charge the power from the power receiving coils CRx11, CRx12, CRx21, and CRx22 to the corresponding battery cells BC11, BC12, BC21, and BC22, and may control current values of the power charged in the corresponding battery cells BC11, BC12, BC21, and BC22. The power charged in the corresponding battery cell BC11, BC12, BC21, and BC22 may be controlled depending on a coupling coefficient set between the power transmitting coil CTx1, CTx11, CTx12, . . . , CTx21, and CTx22 and the power receiving coil CRx11, CRx12, CRx21, and CRx22. The battery unit 130 may include at least one battery cell group, which may include, for example, but not limited to, a plurality of battery cells connected to each other in series.

The coupling coefficient between the power transmitting coil and the power receiving coil will be described in detail with reference to FIGS. 9A and 9B.

Meanwhile, in the case in which the power charging apparatus A and the battery apparatus B described above are implemented as one power charging apparatus, one power charging apparatus may be implemented as the power transmitting apparatus A and the power receiving apparatus B.

Figure 3A:
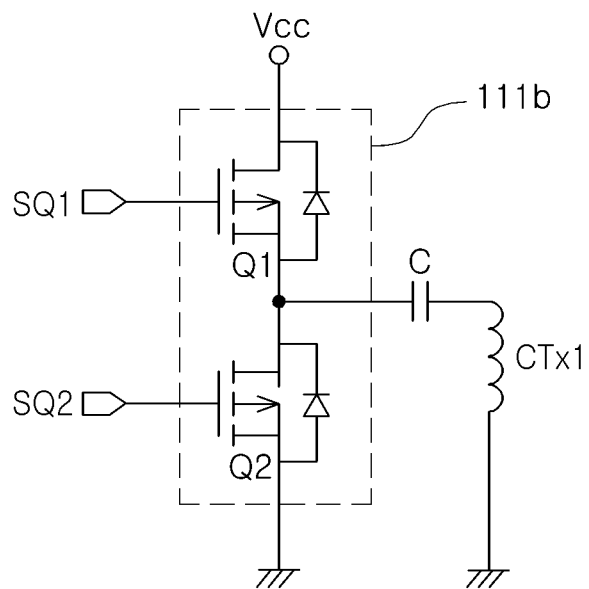
FIGS. 3A and 3B are circuit diagrams schematically illustrating examples of a power supplying unit used in a power charging apparatus according to exemplary embodiments of the present disclosure.
Figure 3A:
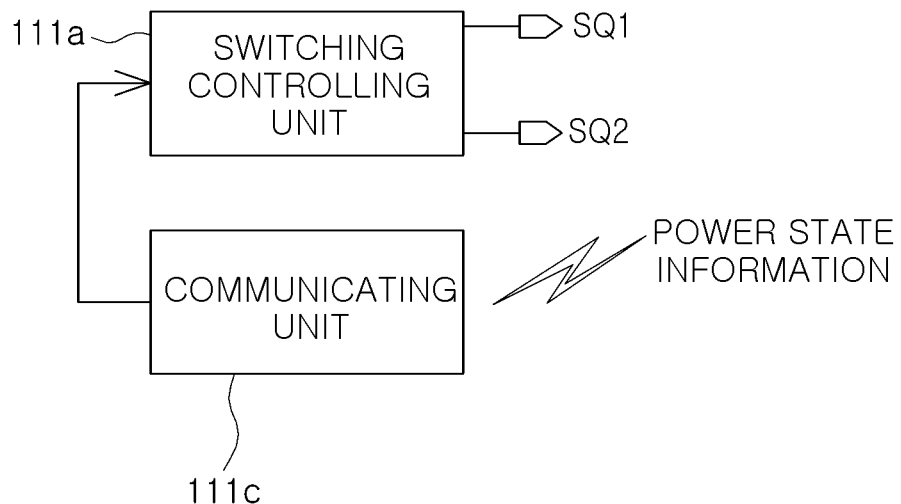
Figure 3B:
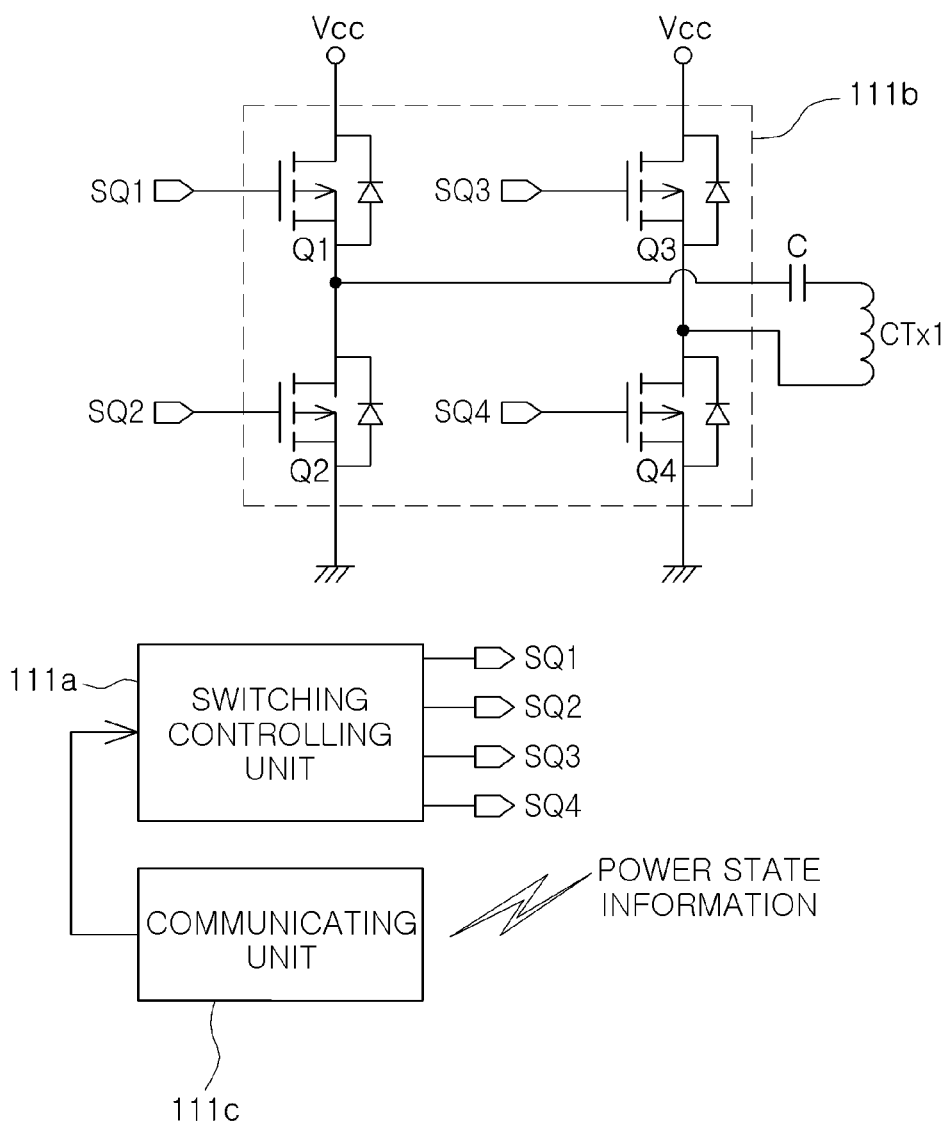
Figure 4A:
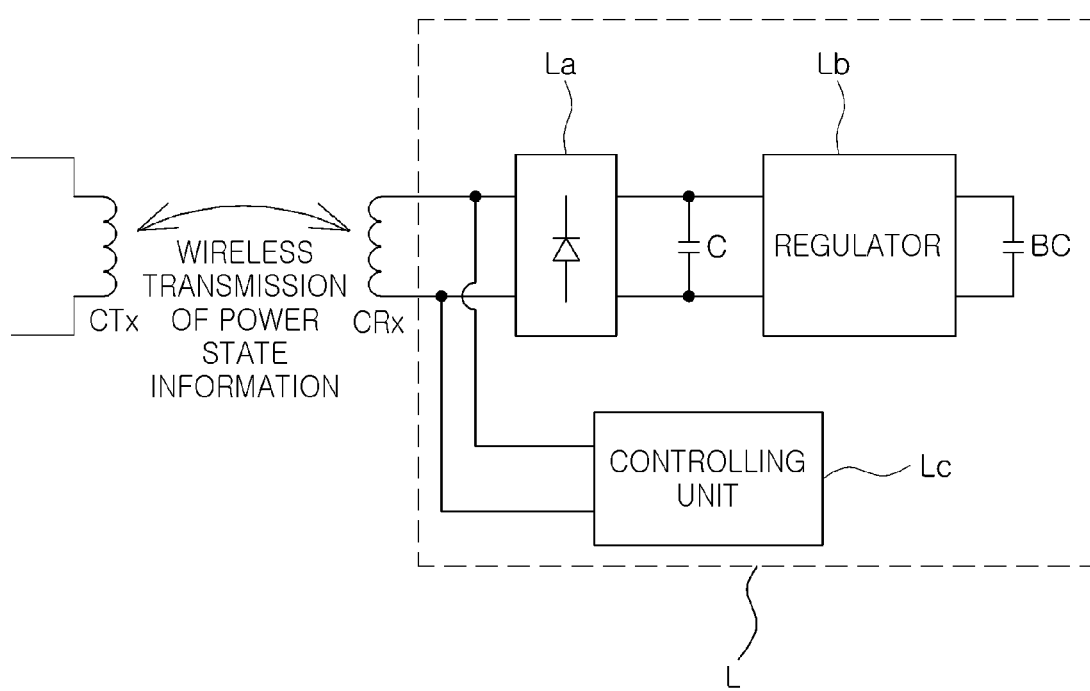
FIGS. 4A through 4D are circuit diagrams schematically illustrating first to fourth examples of a power charging unit according to exemplary embodiments of the present disclosure.
Figure 4B:
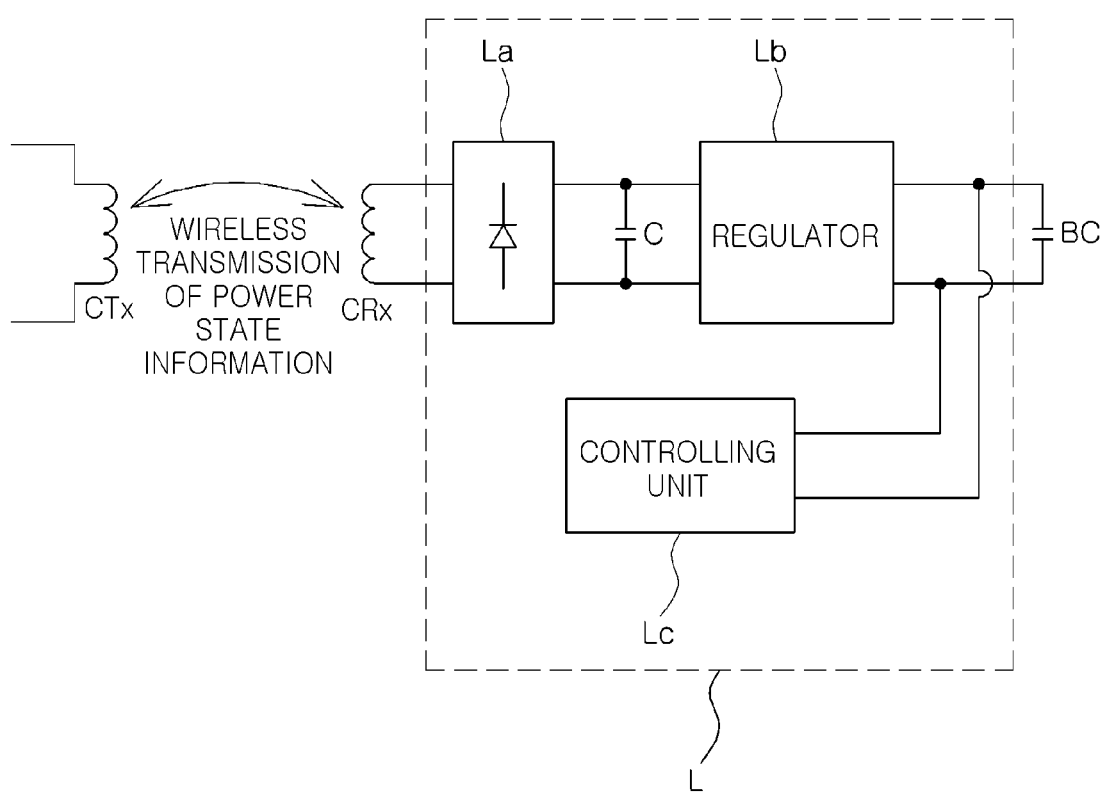
Figure 4C:
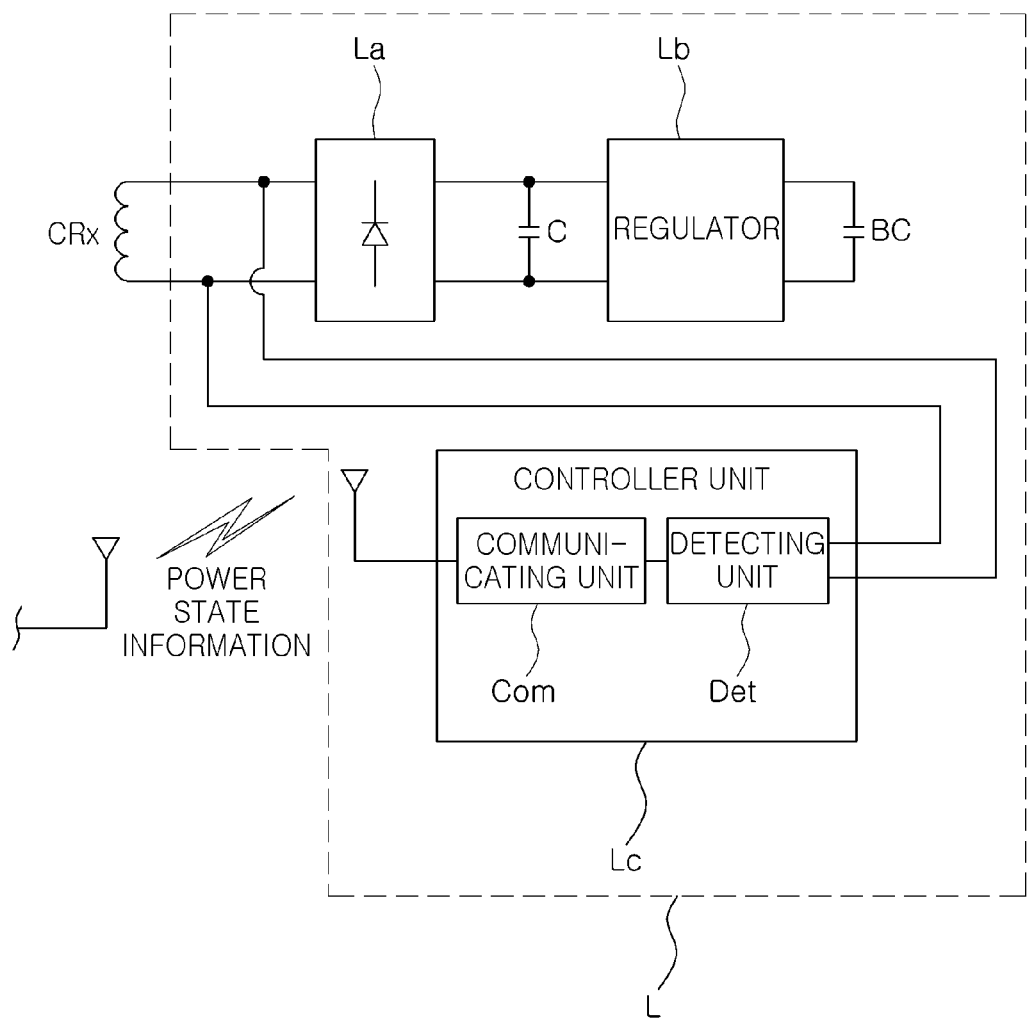
Figure 4D:
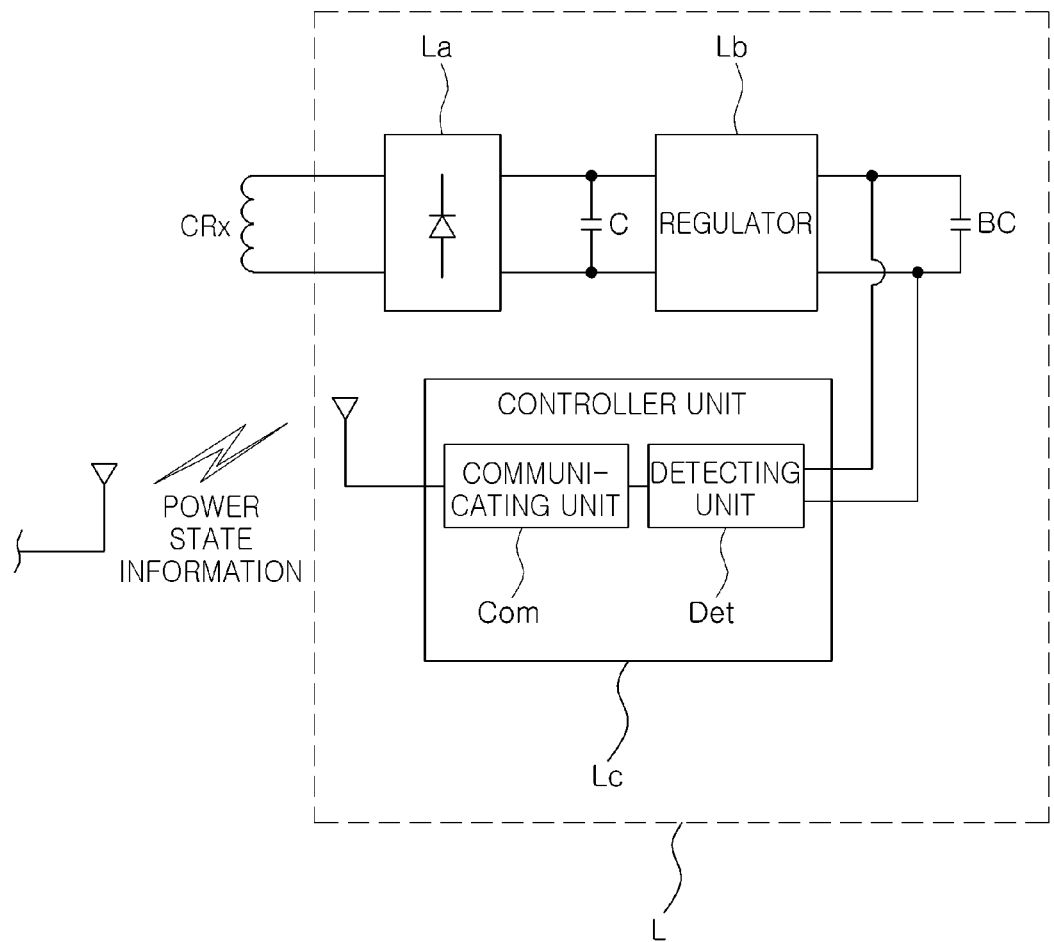

FIGS. 3A and 3B are circuit diagrams schematically illustrating examples of a power supplying unit used in a power charging apparatus according to an exemplary embodiment of the present disclosure.

The power supplying unit 110 may include the power switching unit 111 switching the power of a power transmitting coil CTx1. The number of power transmitting coils included in the power supplying unit 110 may be plural.

The power switching unit 111 may include a switching unit 111b, a switching controlling unit 111a, and a communicating unit 111c. The switching unit 111b may be electrically connected to the power transmitting coil CTx1, switch input power, and wirelessly transmit the power through the power transmitting coil CTx1. The switching controlling unit 111a may provide switching control signals SQ1 and SQ2, or SQ1 to SQ4, for controlling the switching operation of the switching unit 111b. In the case in which the number of power transmitting coils is plural, a plurality of switching units may be connected to the plurality of power transmitting coils in a one-to-one scheme, or the plurality of power transmitting coils may be connected to at least one switching unit.

The communicating unit 111c may receive power charging state information from a wireless power charging target device and provide the power charging state information to the switching controlling unit 111a so that the switching controlling unit 111a can control a switching duty, switching on/off times, and the like, thereby performing a function such as a rapid power charging function, a function of maintaining a power balance between battery cells, or the like.

The switching unit 111b may include at least two switches Q1 and Q2 as shown in FIG. 3A. For example, the switches Q1 and Q2 may be formed of a field effect transistor (FET), but is not limited thereto. The switches Q1, Q2, Q3 and Q4 may have a half bridge switch structure or a full bridge switch structure as shown in FIG. 3B. However, the switches Q1, Q2, Q3 and Q4 are not limited thereto, but may be variously configured. The switches Q1 and Q2 may have a driving power Vcc supplied thereto. A voltage level of the supplied driving power Vcc may be fixed or varied.

FIGS. 4A through 4D are circuit diagrams schematically illustrating first to fourth examples of a power charging unit according to exemplary embodiments of the present disclosure.

Referring to FIGS. 4A through 4D, the power charging unit according to exemplary embodiments of the present disclosure may include a power receiving coil CRx and a power charging controlling unit L.

The power receiving coil CRx may wirelessly receive power from a corresponding power transmitting coil CTx of the power supplying unit. The power charging controlling unit L may control the wirelessly received power and charge the received power in a corresponding battery cell BC.

The power charging controlling unit L may include a rectifying unit La, a regulator Lb, and a controlling unit Lc.

The rectifying unit La may rectify the power received from the power receiving coil CRx, and the regulator Lb may convert the rectified power into an appropriate voltage for charging to control the power charging of the corresponding battery cell BC. The controlling unit Lc may detect a state of the power transmitted to the power receiving coil CRx and wirelessly transmit power state information to the power supplying unit.

To this end, the controlling unit Lc may detect the state of the power from the power receiving coil CRx or the power provided from the regulator Lb to the battery cell BC.

Meanwhile, the controlling unit Lc may wirelessly transmit the power state information having a pulse form to a power transmitting side through the power receiving coil CRx, and may include a separate communicating unit Com to transmit the power state information detected by a detecting unit Det to the power transmitting side through the communicating unit Com in a preset communications scheme.

Figure 5A:
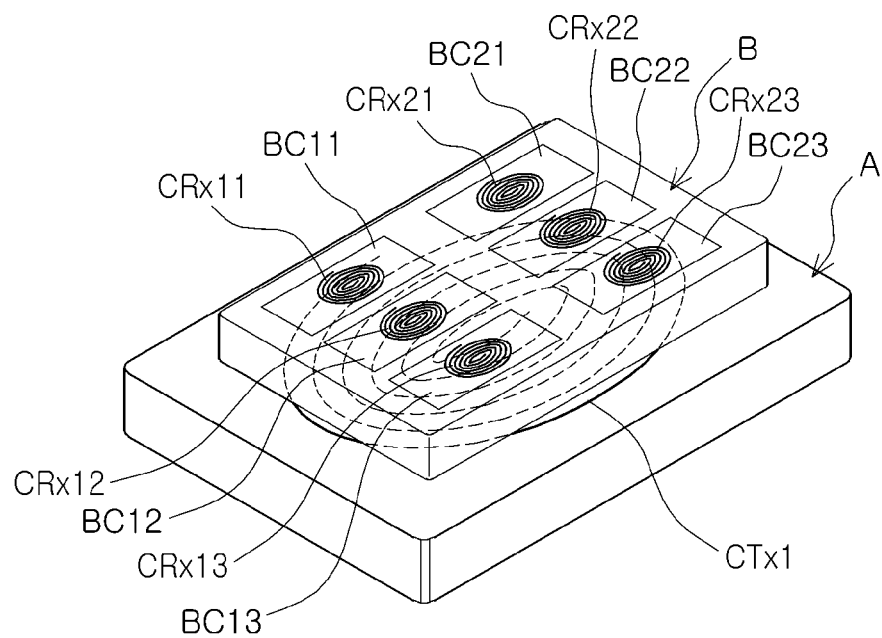
FIGS. 5A through 5C are views illustrating examples and applications of a battery apparatus according to exemplary embodiments of the present disclosure.
Figure 5B:
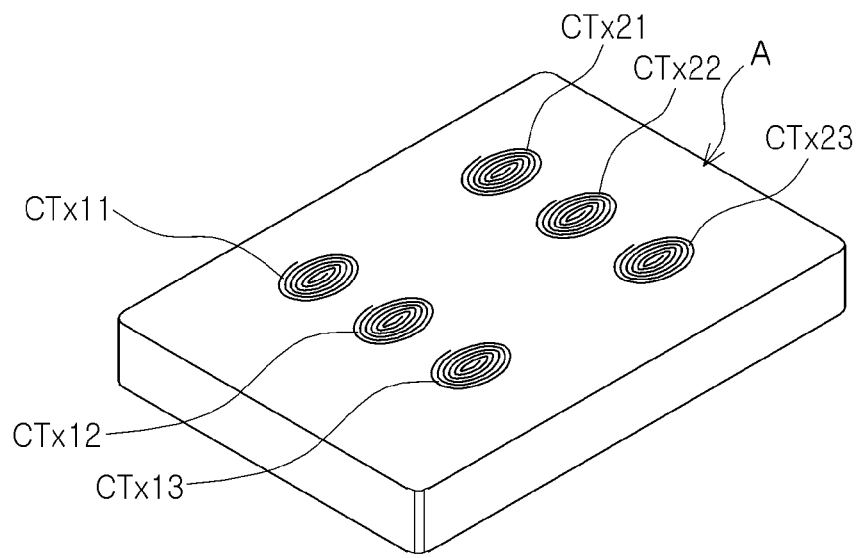
Figure 5C:
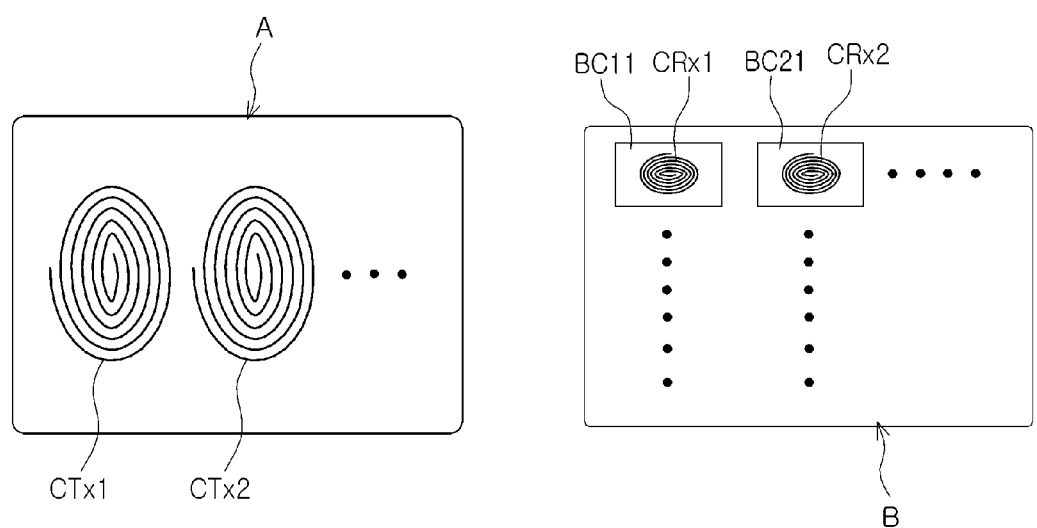

FIGS. 5A through 5C are views illustrating examples and applications of a battery apparatus according to exemplary embodiments of the present disclosure.

Referring to FIG. 5A, the battery apparatus B according to an exemplary embodiment of the present disclosure may include, for example, six battery cells BC11 to BC23. The six battery cells BC11 to BC23 may include three battery cells BC11, BC12, and BC13 and three battery cells BC21, BC22, and BC23, connected to each other in series, respectively, to form one battery cell group, respectively. Two battery cells groups BC11, BC12, and BC13 and BC21, BC22, and BC23 may be configured so as to be connected to each other in parallel (although the battery apparatus B according to an exemplary embodiment of the present disclosure may be used in a cellular phone, a tablet PC, and a laptop PC, or the like, detailed drawings thereof will be omitted).

In addition, as shown in FIG. 5A, six power receiving coils CRx11 to CRx23 each corresponding to the six battery cells BC11 to BC23 may be provided in the battery apparatus B, and may wirelessly receive the power from one or more power transmitting coils of the power charging apparatus A.

For example, the power charging apparatus A may include one power transmitting coil CTx1, as shown in FIG. 5A, or include a plurality of power transmitting coils, for example, but not limited to, six power transmitting coils CTx11 to CTx23 each corresponding to six power receiving coils CRx11 to CRx23, as shown in FIG. 5B.

In addition, referring to FIG. 5C, the power charging apparatus A may include a plurality of power transmitting coils CTx1 and CTx2, and the battery apparatus B may also include a plurality of power receiving coils CRx1 and CRx2, for example, six or more power receiving coils or less than six power receiving coils.

FIGS. 6A through 6D, FIGS. 7A through 7D, and FIGS. 8A and 8B are views illustrating examples of a voltage charging operation according to exemplary embodiments of the present disclosure.

Referring to FIGS. 6A through 6D, amounts VRx1, VRx2, and VRx3 of power transferred to each of the power receiving coils may be different from each other. Therefore, the power supplying unit may differently set the amounts VTx1, VTx2, and VTx3 of the power transmitted from the power receiving coils to the corresponding power transmitting coils in an equal state depending on the power state information.

Figure 6A:
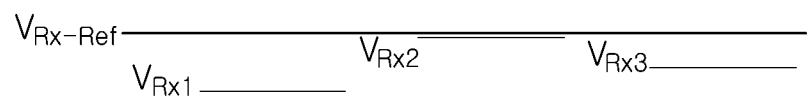
Figure 6A:
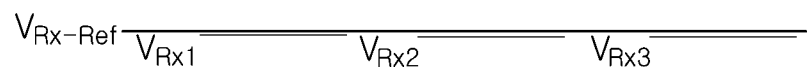
Figure 6A:
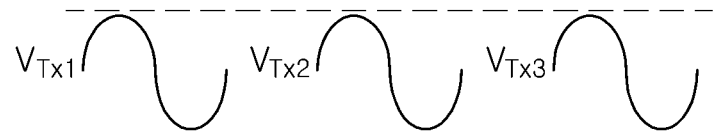
Figure 6A:
Figure 6A:
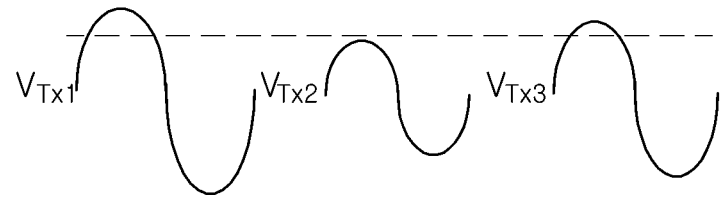

As shown in FIG. 6A, the power supplying unit may maintain a balance between the power so that the levels of power received in the power receiving coils are constant, based on a maximum voltage VRx2 among the voltages VRx1, VRx2, and VRx3 received in the plurality of power receiving coils depending on the power state information from the power charging unit. To the contrary, as shown in FIG. 6D, the power supplying unit may maintain a balance between the power so that the levels of power received in the power receiving coils are constant based on a minimum voltage VRx2 among the voltages VRx1, VRx2, and VRx3 received in the plurality of power receiving coils.

Figure 6B:
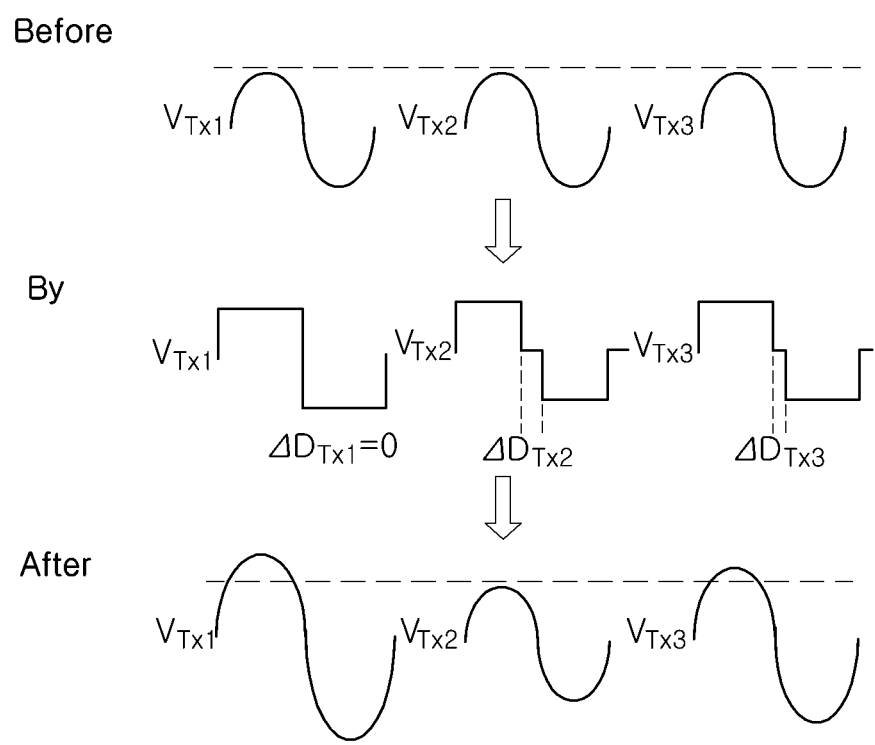
Figure 6C:
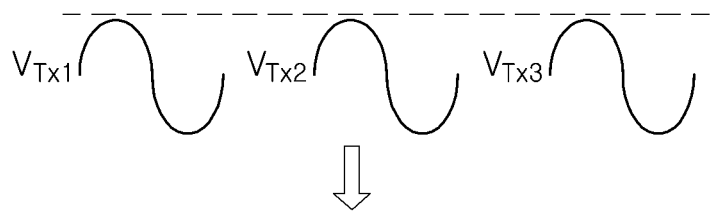
Figure 6C:
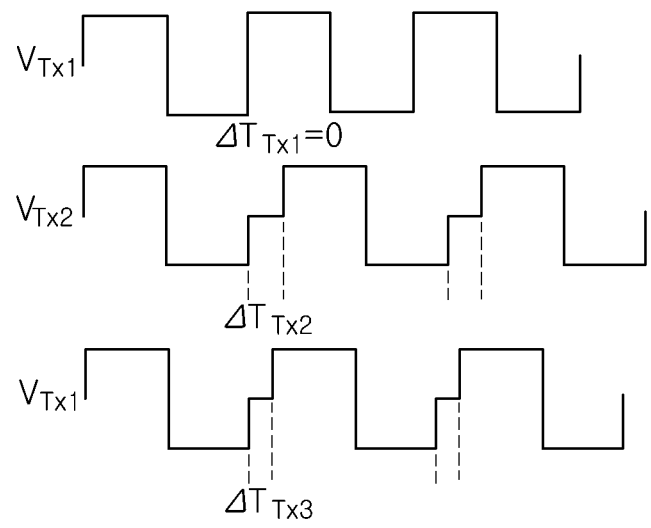
Figure 6C:
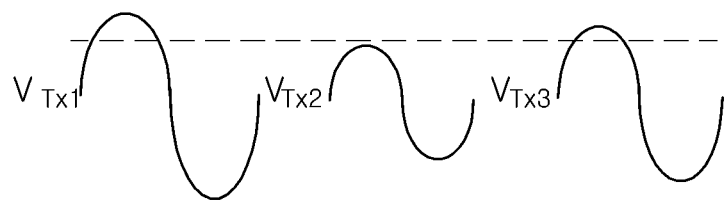
Figure 6D:
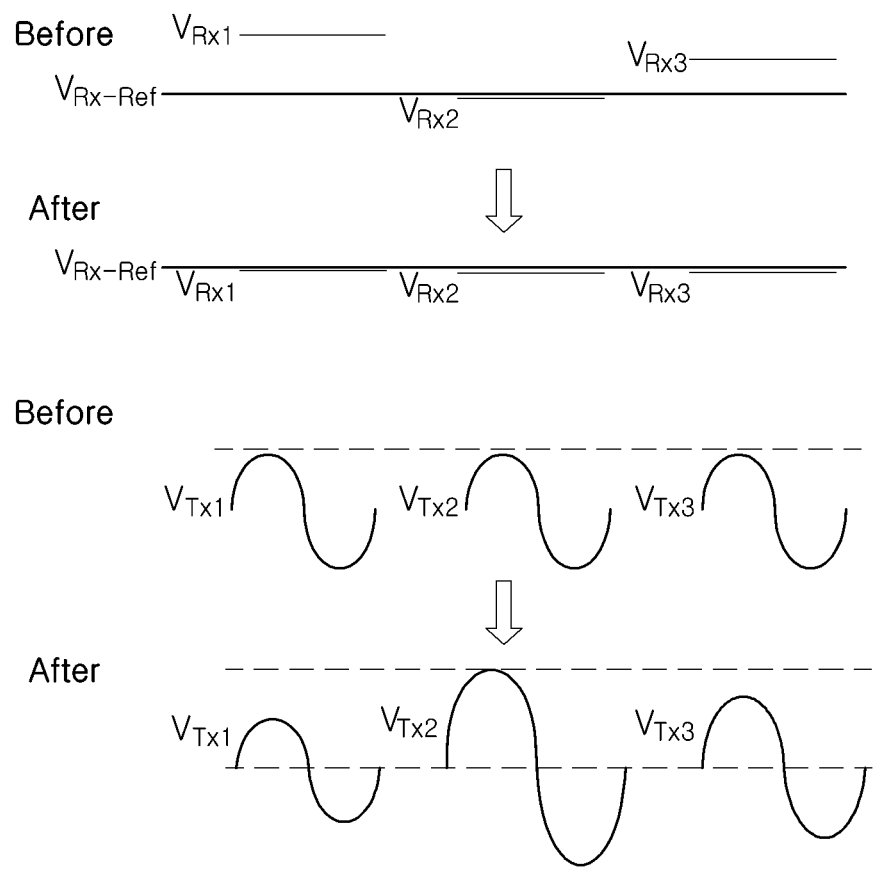

In order to control each of the levels of power transmitted from the power transmitting coils, switching on duties or switching off duties of the corresponding switch circuits may be controlled, as shown in FIG. 6B, or switching down times of the corresponding switch circuits may be controlled, as shown in FIG. 6C.

The above-mentioned operations will be described in more detail with reference to FIGS. 7A through 7D.

Figure 7A:
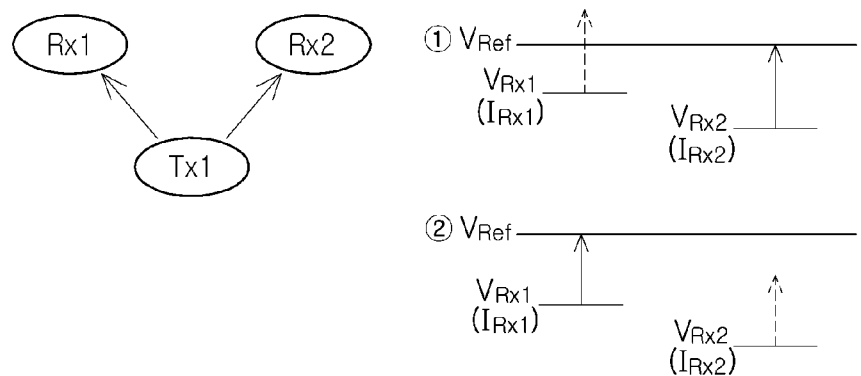

Referring to FIG. 7A, for example, the power charging apparatus according to an exemplary embodiment of the present disclosure may include one power transmitting unit Tx1 that may wirelessly transmit a voltage to at least two power receiving units Rx1 and Rx2.

Here, the power transmitting unit Tx1 may include a configuration shown in FIG. 3A or 3B, and each of the power receiving units Rx1 and Rx2 may include a configuration shown in FIGS. 4A through 4D.

For example, in the case in which a voltage $V_{Rx2}$ (or a current $I_{Rx2}$) detected by a second power receiving unit Rx2 is smaller than a voltage $V_{Rx1}$ (or a current $I_{Rx1}$) detected by a first power receiving unit Rx1, that is, in the case denoted by a reference numeral $\hat{1}$ in FIG. 7A, a magnitude of the power wirelessly transmitted by the power transmitting unit Tx1 may be increased so that the voltage $V_{Rx2}$ detected by the second power receiving unit Rx2 arrives at or is increased to a reference voltage $V_{Ref}$. Therefore, the voltage $V_{Rx1}$ detected by the first power receiving unit Rx1 receiving the power wirelessly transmitted from the power transmitting unit Tx1 may exceed the reference voltage $V_{Ref}$; however, there may be an advantage such as rapid power charging. Here, the reference voltage $V_{Ref}$ may be set, for example, but not limited to, so that a maximum allowable current flows in a corresponding battery cell.

In the case denoted by a reference numeral $\hat{2}$ in FIG. 7A, a magnitude of the power wirelessly transmitted from the power transmitting unit Tx1 may be increased so that the voltage $V_{Rx1}$ detected by the first power receiving unit Rx1 arrives at the reference voltage $V_{Ref}$. Therefore, the voltage $V_{Rx2}$ detected by the second power receiving unit Rx2 receiving the power wirelessly transmitted from the power transmitting unit Tx1 may not arrive at the reference voltage $V_{Ref}$; however, there may be an advantage such as an increase in power transmission efficiency.

Figure 7B:
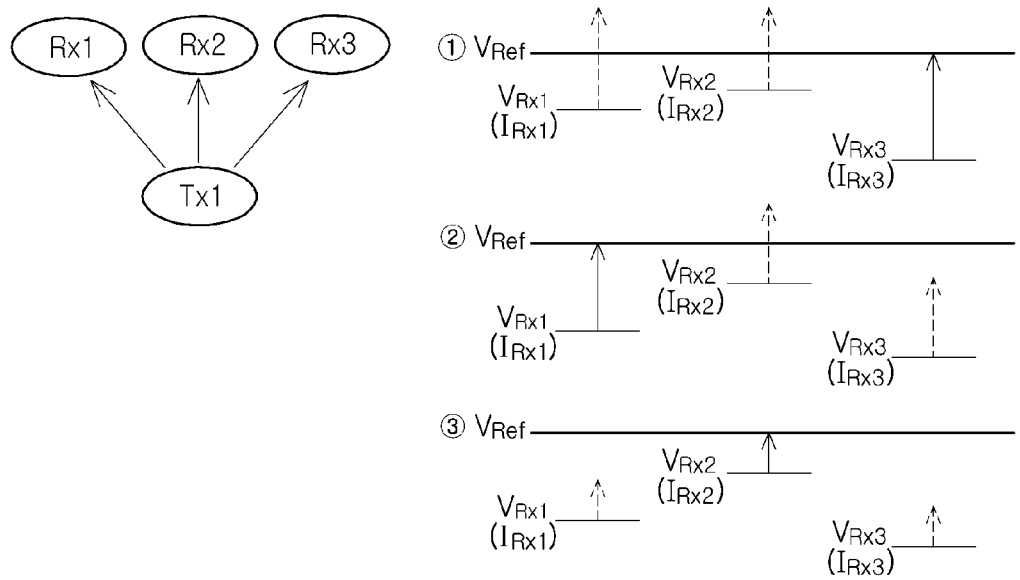

Referring to FIG. 7B, for example, the power charging apparatus according to an exemplary embodiment of the present disclosure may include one power transmitting unit Tx1 that may wirelessly transmit a voltage to at least three power receiving units Rx1, Rx2, and Rx3.

For example, in the case in which a voltage $V_{Rx2}$ (or a current $I_{Rx2}$) detected by a second power receiving unit Rx2 is larger than a voltage $V_{Rx1}$ (or a current $I_{Rx1}$) detected by a first power receiving unit Rx1 and a voltage $V_{Rx3}$ (or a current $I_{Rx3}$) detected by a third power receiving unit Rx3 is smaller than the voltage $V_{Rx1}$ (or the current $I_{Rx1}$) detected by the first power receiving unit Rx1, that is, in the case denoted by a reference numeral $\hat{1}$ in FIG. 7B, a magnitude of the power wirelessly transmitted from the power transmitting unit Tx1 may be increased so that the voltage $V_{Rx3}$ detected by the third power receiving unit Rx3, which is a minimum value, arrives at a reference voltage $V_{ref}$. Therefore, the voltage $V_{Rx1}$, detected by the first power receiving unit Rx1 receiving the power wirelessly transmitted from the power transmitting unit Tx1, and the voltage $V_{RX2}$, detected by the second power receiving unit Rx2 receiving the power wirelessly transmitted from the power transmitting unit Tx1, may exceed the reference voltage $V_{Ref}$; however, there may be an advantage such as rapid power charging. On the other hand, power transmission efficiency may be decreased.

In the case denoted by a reference numeral $\hat{2}$ in FIG. 7B, a magnitude of the power wirelessly transmitted from the power transmitting unit Tx1 may be increased so that the voltage $V_{Rx1}$ detected by the first power receiving unit Rx1, which is an intermediate value, arrives at the reference voltage $V_{Ref}$. Therefore, the voltage VRx2 detected by the second power receiving unit Rx2 receiving the power wirelessly transmitted from the power transmitting unit Tx1 may exceed the reference voltage $V_{Ref}$, and the voltage VRx3 detected by the third power receiving unit Rx3 receiving the power wirelessly transmitted from the power transmitting unit Tx1 may not arrive at the reference voltage $V_{Ref}$.

In the case denoted by a reference numeral $\hat{3}$ in FIG. 7B, a magnitude of the power wirelessly transmitted from the power transmitting unit Tx1 may be increased so that the voltage $V_{Rx2}$ detected by the second power receiving unit Rx2, which is a maximum value, arrives at the reference voltage $V_{Ref}$. Therefore, the voltage $V_{Rx1}$ detected by the first power receiving unit Rx1 receiving the power wirelessly transmitted from the power transmitting unit Tx1 and the voltage $V_{Rx3}$ detected by the third power receiving unit Rx3 receiving the power wirelessly transmitted from the power transmitting unit Tx1 may not arrive at the reference voltage $V_{Ref}$; however, power transmission efficiency may be increased. On the other hand, a voltage charging speed may be decreased.

Figure 7C:
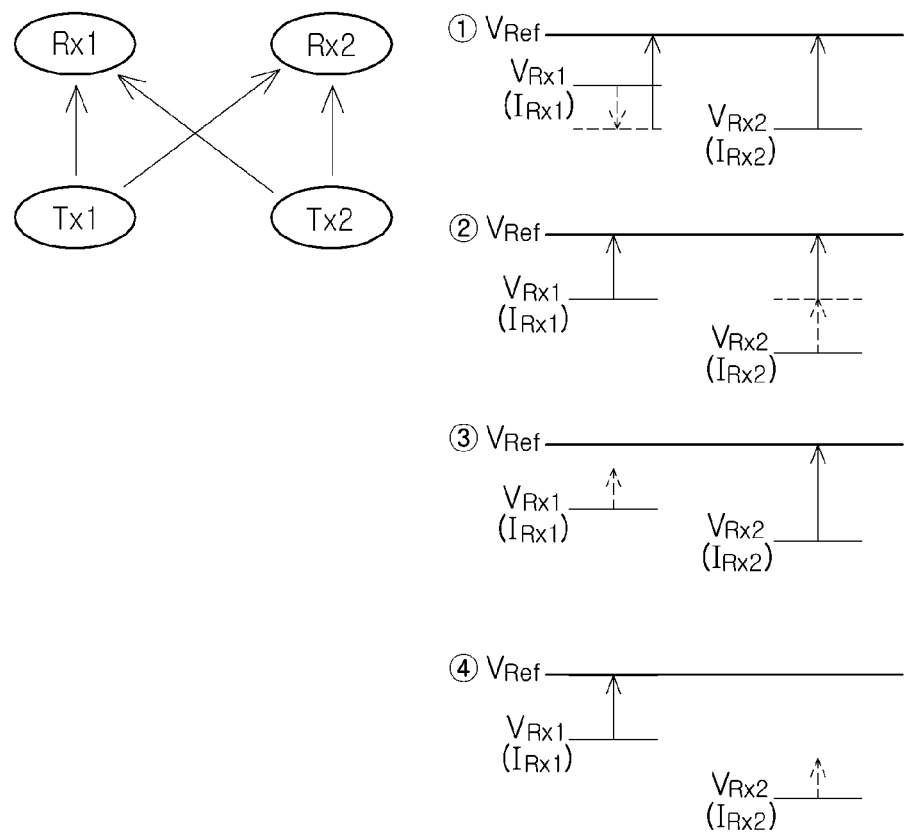

Referring to FIG. 7C, for example, the power charging apparatus according to an exemplary embodiment of the present disclosure may include at least two power transmitting units Tx1 and Tx2 that may wirelessly transmit power to at least two power receiving units Rx1 and Rx2.

For example, in the case in which a voltage $V_{Rx2}$ (or a current $I_{Rx2}$) detected by a second power receiving unit Rx2 is smaller than a voltage $V_{Rx1}$ (or a current $I_{Rx1}$) detected by a first power receiving unit Rx1, that is, in the case denoted by a reference numeral $\hat{1}$ in FIG. 7C, magnitudes of the power wirelessly transmitted by first and second power transmitting units Tx1 and Tx2 may be controlled so that the voltage $V_{Rx1}$ detected by the first power receiving unit Rx1 becomes the same as the voltage $V_{Rx2}$ detected by the second power receiving unit Rx2. Then, the magnitudes of the power wirelessly transmitted from the first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 are changed to the reference voltage $V_{Ref}$.

In the case denoted by a reference numeral $\hat{2}$ in FIG. 7C, the magnitudes of the power wirelessly transmitted from the first and second power transmitting units Tx1 and Tx2 may be controlled so that the voltage $V_{Rx2}$ detected by the second power receiving unit Rx2 becomes the same as the voltage $V_{Rx1}$ detected by the first power receiving unit Rx1. Then, the magnitudes of the power wirelessly transmitted from the first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 are changed to the reference voltage $V_{Ref}$.

On the other hand, in the case denoted by a reference numeral $\hat{3}$ or a reference numeral $\hat{4}$ in FIG. 7C, the magnitudes of the power wirelessly transmitted from the first and second power transmitting units Tx1 and Tx2 may be increased so that the voltage $V_{Rx2}$ detected by the second power receiving unit Rx2 arrives at the reference voltage $V_{Ref}$, or the magnitudes of the power wirelessly transmitted from the first and second power transmitting units Tx1 and Tx2 may be increased so that the voltage $V_{Rx1}$ detected by the first power receiving unit Rx1 arrives at the reference voltage $V_{Ref}$. The increase in an amount of power as described above may be controlled depending on a coupling degree between the power receiving unit and the power charging unit to maintain a balance between the battery cells and/or to charge the respective battery cells with maximum allowable power charging currents, thereby rapidly charging the battery cells with the power.

Figure 7D:
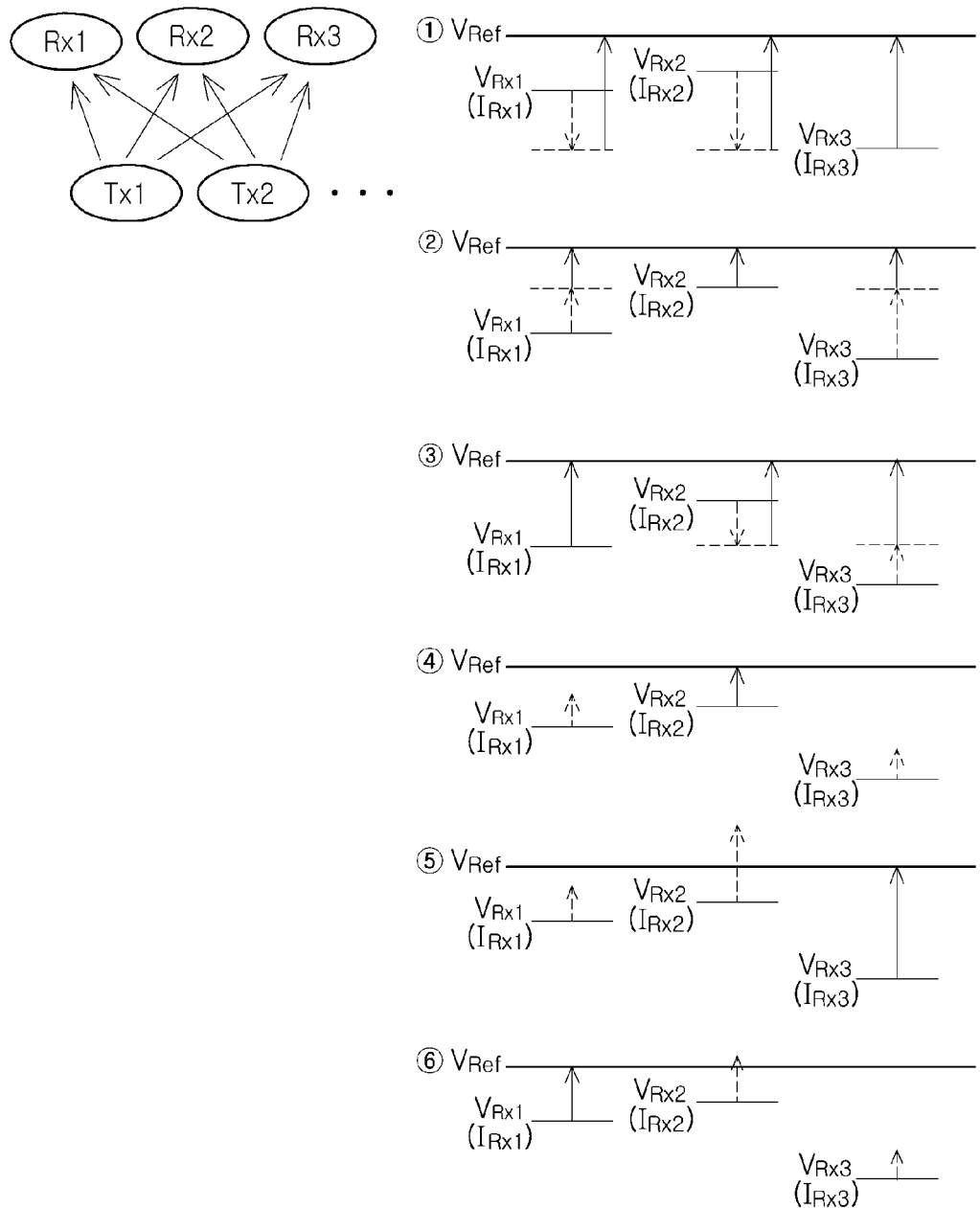

Referring to FIG. 7D, for example, the power charging apparatus according to an exemplary embodiment of the present disclosure may include at least two power transmitting units Tx1 and Tx2 that may wirelessly transmit power to at least three power receiving units Rx1, Rx2, and Rx3.

In the case in which a voltage $V_{Rx2}$ (or a current $I_{Rx2}$) detected by a second power receiving unit Rx2 is larger than a voltage $V_{Rx1}$ (or a current $I_{Rx1}$) detected by a first power receiving unit Rx1 and a voltage $V_{Rx3}$ (or a current $I_{Rx3}$) detected by a third power receiving unit Rx3 is smaller than the voltage $V_{Rx1}$ (or the current $I_{Rx1}$) detected by the first power receiving unit Rx1, that is, in the case denoted by a reference numeral $\hat{1}$ in FIG. 7D, magnitudes of the power wirelessly transmitted from first and second power transmitting units Tx1 and Tx2 may be controlled so that the voltage $V_{Rx1}$ detected by the first power receiving unit Rx1 and the voltage $V_{Rx2}$ detected by the second power receiving unit Rx2 become the same as the voltage $V_{Rx3}$ detected by the third power receiving unit Rx3, which is a minimum value. Then, the magnitudes of the power wirelessly transmitted from the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to a reference voltage $V_{Ref}$.

In the case denoted by a reference numeral $\hat{2}$ in FIG. 7D, the magnitudes of the power wirelessly transmitted by the first and second power transmitting units Tx1 and Tx2 may be controlled so that the voltage $V_{Rx1}$ detected by the first power receiving unit Rx1 and the voltage $V_{Rx3}$ detected by the third power receiving unit Rx3 become the same as the voltage $V_{Rx2}$ detected by the second power receiving unit Rx2, which is a maximum value. Then, the magnitudes of the power wirelessly transmitted from the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to the reference voltage $V_{Ref}$.

In the case denoted by a reference numeral $\hat{3}$ in FIG. 7D, the magnitudes of the power wirelessly transmitted by the first and second power transmitting units Tx1 and Tx2 may be controlled so that the voltage $V_{Rx2}$ detected by the second power receiving unit Rx2 and the voltage $V_{Rx3}$ detected by the third power receiving unit Rx3 become the same as the voltage $V_{Rx1}$ detected by the first power receiving unit Rx1, which is an intermediate value. Then, the magnitudes of the power wirelessly transmitted from the first and second power transmitting units Tx1 and Tx2 may be controlled so that the voltage $V_{Rx1}$ detected by the first power receiving unit Rx1, the voltage $V_{Rx2}$ detected by the second power receiving unit Rx2, and the voltage $V_{Rx3}$ detected by the third power receiving unit Rx3 are changed to the reference voltage $V_{Ref}$.

In addition, in the case denoted by reference numerals $\hat{4}$, $\hat{5}$ or $\hat{6}$ in FIG. 7D, the magnitudes of the power wirelessly transmitted from the first and second power transmitting units Tx1 and Tx2 may be increased so that the voltage $V_{Rx2}$ detected by the second power receiving unit Rx2 arrives at the reference voltage $V_{Ref}$, the magnitudes of the power wirelessly transmitted from the first and second power transmitting units Tx1 and Tx2 may be increased so that the voltage $V_{Rx3}$ detected by the third power receiving unit Rx3 arrives at the reference voltage $V_{Ref}$, or the magnitudes of the power wirelessly transmitted from the first and second power transmitting units Tx1 and Tx2 may be increased so that the voltage $V_{Rx1}$ detected by the first power receiving unit Rx1 arrives at the reference voltage $V_{Ref}$. The first and second power transmitting units Tx1 and Tx2 may increase the magnitudes of the power wirelessly transmitted from the first and second power transmitting units Tx1 and Tx2 so that the voltages detected by the power receiving units coupled to the first and second power transmitting units Tx1 and Tx2 are changed to the reference voltage $V_{Ref}$. However, in this case, the power may also be wirelessly transmitted to power transmitting units disposed in the vicinity of the first and second power transmitting units Tx1 and Tx2.

Meanwhile, referring to FIGS. 8A and 8B, in the case in which the power charging apparatus according to an exemplary embodiment of the present disclosure includes at least two power transmitting units Tx1 and Tx2 as shown in FIGS. 7C and 7D, wireless power coupling between the power transmitting units Tx1 and Tx2 and at least two or three or more power receiving units Rx1, Rx2, and Rx3 may be set. For example, in the case in which power transmitting units wirelessly transmit powers, it may be set that the power receiving units receiving the most power from the corresponding power transmitting units have the highest wireless power coupling relationship.

To this end, a voltage coupling relationship between corresponding power transmitting units and power receiving units may be set depending on power state information having information on the voltages or the currents detected by the power receiving units Rx1, Rx2, and Rx3. For example, two power transmitting units Tx1 and Tx2 may be sequentially turned on/off to search the power receiving units receiving the most power from the corresponding power transmitting units, as shown in FIG. 8A, or wireless power transmission amounts of the power transmitting units Tx1 and Tx2 may be alternately varied to search the power receiving units having the largest change amount of the power received from the corresponding power transmitting units, as shown in FIG. 8B.

Figure 9A:
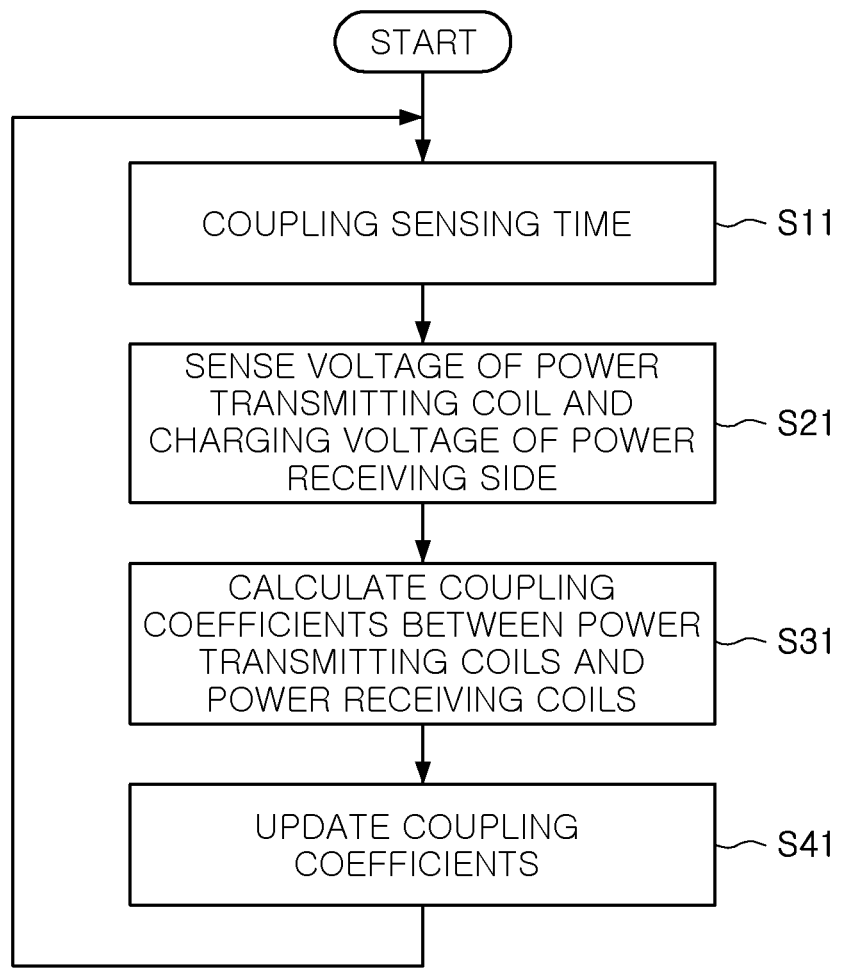
FIGS. 9A and 9B are flow charts illustrating examples of a method of sensing a coupling coefficient according to exemplary embodiments of the present disclosure.
Figure 9B:
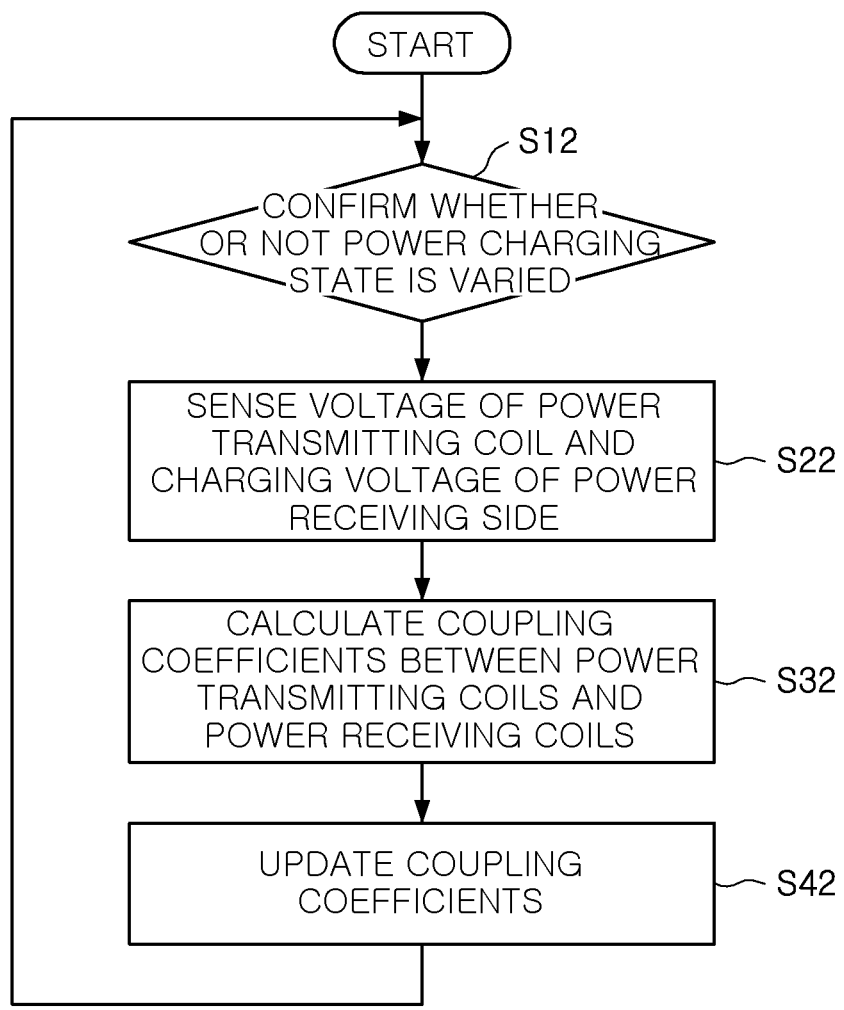

FIGS. 9A and 9B are flow charts illustrating examples of a method of sensing a coupling coefficient according to exemplary embodiments of the present disclosure.

First, referring to FIG. 9A, at a sensing time in which a coupling coefficient is sensed at a preset period (S11), a voltage or current level of power transmitted from a power transmitting coil of a power transmitting unit and a voltage or current level of power applied to a power receiving coil or a battery of a power receiving unit may be detected (S21), and a coupling coefficient between a power transmitting side and a power receiving side may be calculated (S31).

The calculated coupling coefficient may be transferred to a control circuit controlling transmission power of the power transmitting unit (S41).

Referring to FIG. 9B, in the case in which a voltage charging state is varied (S12), a voltage or current level of power transmitted by a power transmitting coil of a power transmitting unit and a voltage or current level of power applied to a power receiving coil or a battery of a power receiving unit may be detected (S22), and a coupling coefficient between a power transmitting side and a power receiving side may be calculated (S32). The calculated coupling coefficient may be transferred to a control circuit controlling transmission power of the power transmitting unit (S42).

Here, the case in which the power charging state is varied may mean, for example, but not limited to, a case in which a new power charging condition, such as a change in a position of the power charging apparatus or the battery apparatus, addition of another battery apparatus in addition to an existing battery apparatus charged with a voltage from the power charging apparatus, or the like, occurs. An example of a method of detecting the above-mentioned new power charging condition may include the case of detecting the case in which the voltage or current level of the power applied to the power receiving coil or the battery of the power receiving unit is varied by a reference level or more.

The coupling coefficient between the power charging apparatus and the battery apparatus described above may be calculated by sequentially turning on/off the power transmitting units Tx1 and Tx2 to search the power receiving units receiving the most power from the corresponding power transmitting units, as shown in FIG. 8A, or alternately varying the wireless power transmission amounts of the power transmitting units Tx1 and Tx2 to search the power receiving units having the largest change amount of powers received from the corresponding power transmitting units, as shown in FIG. 8B.

First, a relationship between the voltage levels of the power applied to the power receiving coils or the batteries of the power receiving units of the battery apparatus and the voltage levels of the power transmitted through the power transmitting coils of the power transmitting units of the power charging apparatus may be represented by the following Equation 1.

$$\begin{bmatrix} V_{Rx1} \\ V_{Rx2} \end{bmatrix} = \begin{bmatrix} C_{11} & C_{12} \\ C_{21} & C_{22} \end{bmatrix} \begin{bmatrix} V_{Tx1} \\ V_{Tx2} \end{bmatrix} \quad \text{(Equation 1)}$$

Here, $V_{Rx1}$ and $V_{Rx2}$ indicate voltage levels of power applied to power receiving coils or batteries of power receiving units Rx1 and Rx2, respectively, $V_{Tx1}$ and $V_{Tx2}$ indicate voltage levels of powers applied to power transmitting coils of power transmitting units Tx1 and Tx2, respectively, and $C_{11}$, $C_{12}$, $C_{21}$, and $C_{22}$ indicate coupling coefficients between the power charging apparatus and the battery apparatus, that is, between the power receiving units Rx1 and Rx2 and the power transmitting units Tx1 and Tx2.

The case in which the number of each of the power transmitting coils and the power receiving coils is two has been described by way of example. Meanwhile, also in the case in which the number of each of the power transmitting coils and the power receiving coils is three or more, a relationship between the voltage levels of the power applied to the power receiving coils or the batteries of the power receiving units of the battery apparatus and the voltage levels of the power transmitted through the power transmitting coils of the power transmitting units of the power charging apparatus may be represented in the same scheme as the above-mentioned scheme. In addition, $C_{ij}$ indicates a coupling coefficient between $V_{Rxi}$ and $V_{Txj}$.

In the case in which the coupling coefficients are calculated by sequentially turning on/off the power transmitting units Tx1 and Tx2 to search the power receiving units receiving the most power from the corresponding power transmitting units, as shown in FIG. 8A, for example, when the power applied to the power transmitting unit Tx2 is turned off, the above Equation 1 may be represented by the following Equation 2.

$$\begin{bmatrix} V_{Rx1} \\ V_{Rx2} \end{bmatrix} = \begin{bmatrix} C_{11} & C_{12} \\ C_{21} & C_{22} \end{bmatrix} \begin{bmatrix} V_{Tx1} \\ 0 \end{bmatrix} = \begin{bmatrix} C_{11} \cdot V_{Tx1} \\ C_{21} \cdot V_{Tx1} \end{bmatrix} \quad \text{(Equation 2)}$$

From the above Equation 2, coupling coefficients $C_{11}$ and $C_{21}$ may be calculated by the following Equation 3.

$$\begin{bmatrix} C_{11} \\ C_{21} \end{bmatrix} = \begin{bmatrix} \frac{V_{Rx1}}{V_{Tx1}} \\ \frac{V_{Rx2}}{V_{Tx1}} \end{bmatrix} \quad \text{(Equation 3)}$$

Next, when the power applied to the power transmitting unit Tx1 is turned off, the coupling coefficients $C_{12}$ and $C_{22}$ may be calculated by the following Equation 4.

$$\begin{bmatrix} C_{12} \\ C_{22} \end{bmatrix} = \begin{bmatrix} \frac{V_{Rx1}}{V_{Tx2}} \\ \frac{V_{Rx2}}{V_{Tx2}} \end{bmatrix} \quad \text{(Equation 4)}$$

Meanwhile, in the case in which the coupling coefficients are calculated by alternately varying the wireless power transmission amounts of the power transmitting units Tx1 and Tx2 to search the power receiving units having the largest change amount of power received from the corresponding power transmitting units, as shown in FIG. 8B, a relationship between varied amounts in the voltage levels of the power applied to the power receiving coils or the batteries of the power receiving units of the battery apparatus and varied amounts in the voltage levels of the powers transmitted through the power transmitting coils of the power transmitting units of the power charging apparatus may be represented by the following Equation 5.

$$\begin{bmatrix} \Delta V_{Rx1} \\ \Delta V_{Rx2} \end{bmatrix} = \begin{bmatrix} C_{11} & C_{12} \\ C_{21} & C_{22} \end{bmatrix} \begin{bmatrix} \Delta V_{Tx1} \\ \Delta V_{Tx2} \end{bmatrix} \quad \text{(Equation 5)}$$

Here, $\Delta V_{Rx1}$ and $\Delta V_{Rx2}$ indicate varied amounts in voltage levels of power applied to power receiving coils or batteries of power receiving units Rx1 and Rx2, respectively, $\Delta V_{Tx1}$ and $\Delta V_{Tx2}$ indicate varied amounts in voltage levels of power applied to power transmitting coils of power transmitting units Tx1 and Tx2, respectively, and $C_{11}$, $C_{12}$, $C_{21}$, and $C_{22}$ indicate be coupling coefficients between the power charging apparatus and the battery apparatus, that is, between the power receiving units Rx1 and Rx2 and the power transmitting units Tx1 and Tx2.

First, when an output voltage of the power transmitting unit Tx2 is fixed ($\Delta V_{Tx2}=0$) and an output voltage of the power transmitting unit Tx1 is varied by a predetermined magnitude, the voltage levels of the power transmitted to the power receiving units Rx1 and Rx2 may be varied depending on a coupling degree between the power receiving units Rx1 and Rx2 and the power transmitting unit Tx1, and this relationship may be represented by the following Equation 6.

$$\begin{bmatrix} \Delta V_{Rx1} \\ \Delta V_{Rx2} \end{bmatrix} = \begin{bmatrix} C_{11} & C_{12} \\ C_{21} & C_{22} \end{bmatrix} \begin{bmatrix} \Delta V_{Tx1} \\ 0 \end{bmatrix} = \begin{bmatrix} C_{11} \cdot \Delta V_{Tx1} \\ C_{21} \cdot \Delta V_{Tx1} \end{bmatrix} \quad \text{(Equation 6)}$$

From the above Equation 6, coupling coefficients $C_{11}$ and $C_{21}$ may be calculated by the following Equation 7.

$$\begin{bmatrix} C_{11} \\ C_{21} \end{bmatrix} = \begin{bmatrix} \frac{\Delta V_{Rx1}}{\Delta V_{Tx1}} \\ \frac{\Delta V_{Rx2}}{\Delta V_{Tx1}} \end{bmatrix} \quad \text{(Equation 7)}$$

Next, when an output voltage of the power transmitting unit Tx1 is fixed ($\Delta V_{Tx1}=0$) and an output voltage of the power transmitting unit Tx2 is varied by a predetermined magnitude, the coupling coefficients $C_{12}$ and $C_{22}$ may be calculated by the following Equation 8.

$$\begin{bmatrix} C_{12} \\ C_{22} \end{bmatrix} = \begin{bmatrix} \frac{\Delta V_{Rx1}}{\Delta V_{Tx2}} \\ \frac{\Delta V_{Rx2}}{\Delta V_{Tx2}} \end{bmatrix} \quad \text{(Equation 8)}$$

Although the case in which the coupling coefficients are calculated based on the voltage levels of the power applied to the power receiving coils or the batteries and the voltage levels of the powers applied to the power transmitting coils has been described by way of example hereinabove, current levels of the power applied to the power receiving coils or the batteries and current levels of the power applied to the power transmitting coils may also be used.

Figure 10A:
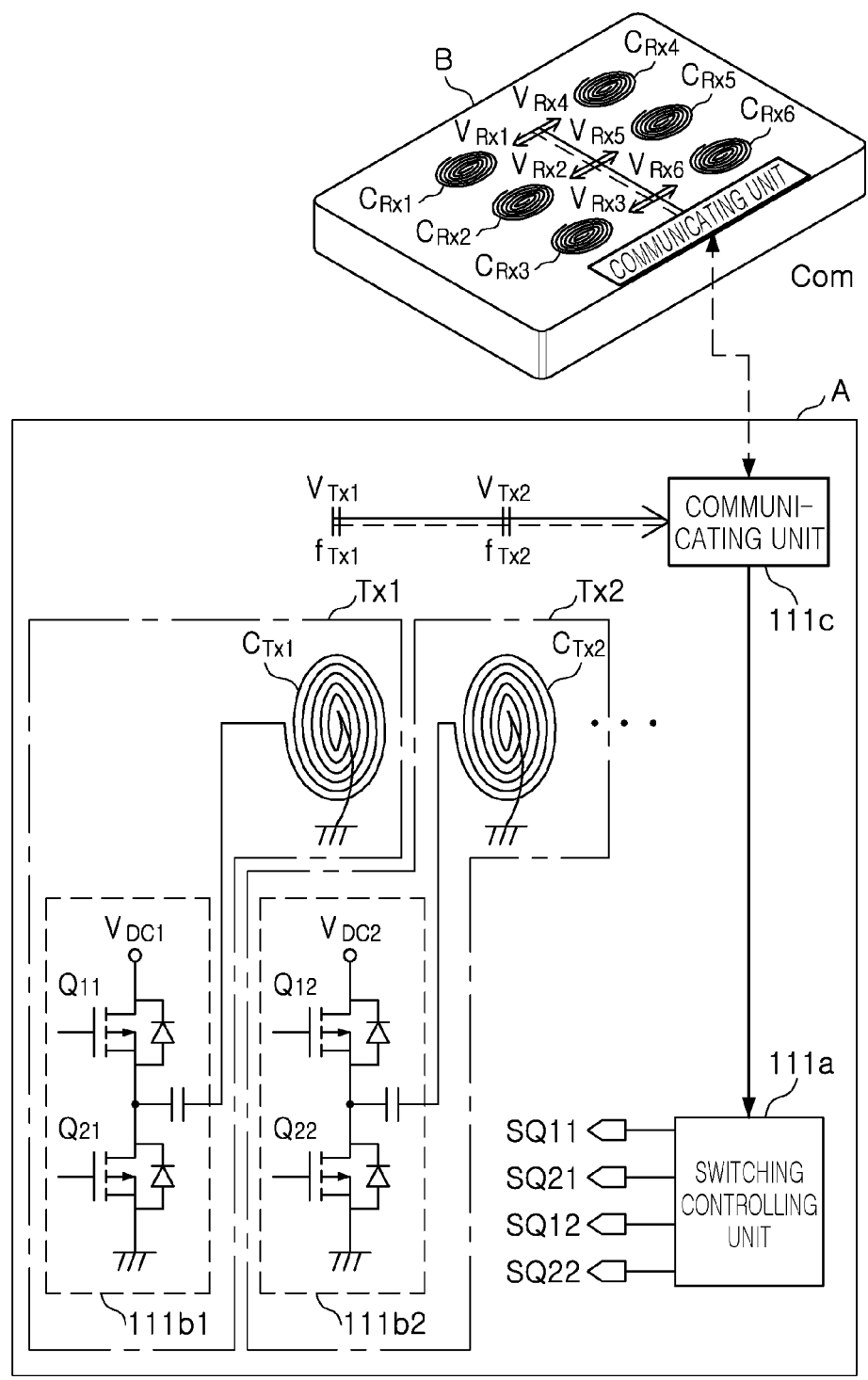
FIGS. 10A and 10B are circuit diagrams schematically illustrating examples of data communications between a power charging apparatus and a battery apparatus according to exemplary embodiments of the present disclosure.
Figure 10B:
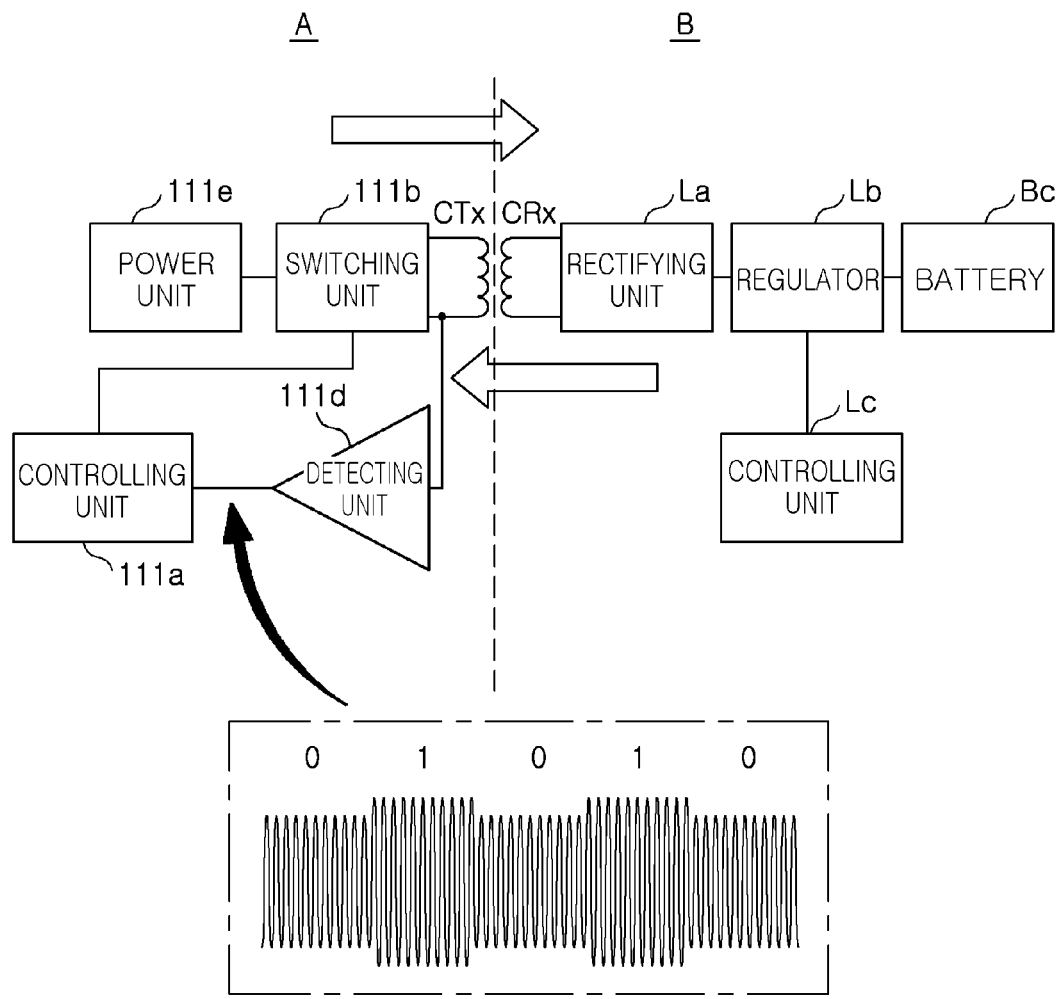

FIGS. 10A and 10B are circuit diagrams schematically illustrating data communications between a power charging apparatus and a battery apparatus according to exemplary embodiments of the present disclosure.

Referring to FIG. 10A, the power transmitting units Tx1 and Tx2 of the power charging apparatus A may include power transmitting coils $C_{Tx1}$ and $C_{Tx2}$ and switching units 111b1 and 111b2. The switching units 111b1 and 111b2 may transfer power to the power transmitting coils CTx1 and CTx2, respectively, in order to calculate the coupling coefficients between the power transmitting side and the power receiving side as described above.

The respective switches Q11, Q21, Q12, and Q22 of the switching units 111b1 and 111b2 may switch driving power $V_{DC1}$ and $V_{DC2}$ depending on switching control signals SQ11, SQ21, SQ12, and SQ22 from the switching controlling unit 111a to transfer the power to the outside through the corresponding power transmitting coils $C_{Tx1}$ and $C_{Tx2}$ in a non-contact scheme.

The switching controlling unit 111a may control power switching of the switching units 111b1 and 111b2 depending on information of the battery apparatus B transferred from the communicating unit 111c. For example, the switching controlling unit 111a may control switching duties or on-off down times of the respective switches Q11, Q21, Q12, and Q22 to adjust the voltage levels $V_{Tx1}$ and $V_{Tx2}$ of the power output through the power transmitting coils $C_{Tx1}$ and $C_{Tx2}$, control voltage levels of the driving power $V_{DC1}$ and $V_{DC2}$ to adjust the voltage levels $V_{Tx1}$ and $V_{Tx2}$ of the power output through the power transmitting coils $C_{Tx1}$ and $C_{Tx2}$, or control switching frequencies $f_{Tx1}$ and $f_{Tx2}$ to control frequencies at which the power is transmitted through the power transmitting coils $C_{Tx1}$ and $C_{Tx1}$.

The above-mentioned adjusting or controlling operation may be performed based on the coupling coefficients between the power transmitting side and the power receiving side, and since information on a position, a voltage charging state, an operating state, charging power, and the like, of the battery apparatus B may be continuously needed for power charging of the power charging apparatus A, the information may be transferred by bidirectional communications between the communicating unit 111c of the power charging apparatus A and the communicating unit Com of the battery apparatus B. In addition, information on positions, power transmitting states, power switching operations, charging voltages, and the like, of the power transmitting coils $C_{Tx1}$ and $C_{Tx2}$ of the power charging apparatus A may be transferred to the battery apparatus B through the communicating unit Com of the battery apparatus B. In addition, the voltage or current levels of the powers received by the power receiving coils $C_{Rx1}$, $C_{Rx2}$, $C_{Rx3}$, $C_{Rx4}$, $C_{Rx5}$ and $C_{Rx6}$ or the power applied to the batteries may be transferred to the power charging apparatus A through the communicating unit 111c, and the voltage or current levels of the power applied to the power transmitting coils $C_{Tx1}$ and $C_{Tx2}$ may be transferred to the battery apparatus B through the communicating unit. In addition, in the case in which the coupling coefficients between the power transmitting coils $C_{Tx1}$ and $C_{Tx2}$ of the power charging apparatus A and the power receiving coils $C_{Rx1}$, $C_{Rx2}$, $C_{Rx3}$, $C_{Rx4}$, $C_{Rx5}$ and $C_{Rx6}$ of the battery apparatus B are calculated in the battery apparatus B, the calculated coupling coefficients may be transferred to the power charging apparatus A through the communicating unit 111c.

In the above-mentioned bidirectional communications, various communications schemes such as Bluetooth, Zigbee, WiFi, near field communications (NFC), and the like, and various communication frequencies may be used.

Referring to FIG. 10B, the power may be transmitted and the information may be transferred in the non-contact scheme between the power transmitting coil CTx of the power charging apparatus A and the power receiving coil CRx of the battery apparatus B.

The power supplying unit 110 of the power charging apparatus A may include a power unit 111e, a switching unit 111b, a detecting unit 111d and a controlling unit 111a. The power unit 111e may convert an alternating current (AC) power into a direct current (DC) voltage. The switching unit 111b may switch the DC voltage from the power unit 111e depending on a control of the controlling unit 111a to transmit the DC voltage to the outside through the power transmitting coil CTx. The detecting unit 111d may detect a power state of the power transmitting coil CTx. The controlling unit 111a may control the switching of the switching unit 111b depending on detected information from the detecting unit 111d.

The battery apparatus B may include a rectifying unit La, a regulator Lb, and a controlling unit Lc. The rectifying unit La may rectify a voltage from the power receiving coil CRx. The regulator Lb may regulate the rectified power to a charging power appropriate for being charged in a battery Bc. The controlling unit Lc may control an operation of the regulator Lb.

The power transmitted to the power receiving coil CRx may be varied by the operation of the regulator Lb, variations in a voltage level of the power receiving coil CRx may affect the power transmitting coil CTx by magnetic coupling between the power receiving coil CRx and the power transmitting coil CTx, the detecting unit 111d may detect the variations in the voltage level of the power receiving coil CRx and transfer detected information to the controlling unit 111a, and the controlling unit 111a may control the switching operation of the switching unit 111b depending on the detected information.

Communications may be performed between the battery apparatus B and the power charging apparatus A depending on, for instance, but not limited to, the above-mentioned variations in voltage levels. In addition, information on the voltage or current levels of the power received by the power receiving coils of the battery apparatus B, information on the voltage or current levels of the power applied to the batteries of the battery apparatus B, the information on the position, the power charging state, the operating state, and the charging power of the battery apparatus B, information on the voltage or current levels of the power applied to the power transmitting coils of the power charging apparatus A, and information on the positions, the power transmitting states, the power switching operations, the power, and the like, of the power transmitting coils of the power charging apparatus A may be transmitted and received using the communications performed in this scheme.

Here, in the case in which the number of each of the power transmitting coils and the power receiving coils is plural, the information may be transmitted and received, for example, but not limited to, in a time division scheme.

The coupling coefficients between the power transmitting coils of the power charging apparatus A and the power receiving coils of the battery apparatus B may be calculated based on the transmitted and received information. For instance, the power charging apparatus A may calculate the coupling coefficients based on the transmitted and received information, or the battery apparatus B may calculate the coupling coefficients based on the transmitted and received information and then transmit the calculated coupling coefficients to the power charging apparatus A by the communications performed between the battery apparatus B and the power charging apparatus A depending on the above-mentioned variations in voltage levels.

The switching operation of the switching unit 111*b* of the power charging apparatus A may be controlled based on the coupling coefficients between the power transmitting coils of the power charging apparatus A and the power receiving coils of the battery apparatus B.

Figure 11:
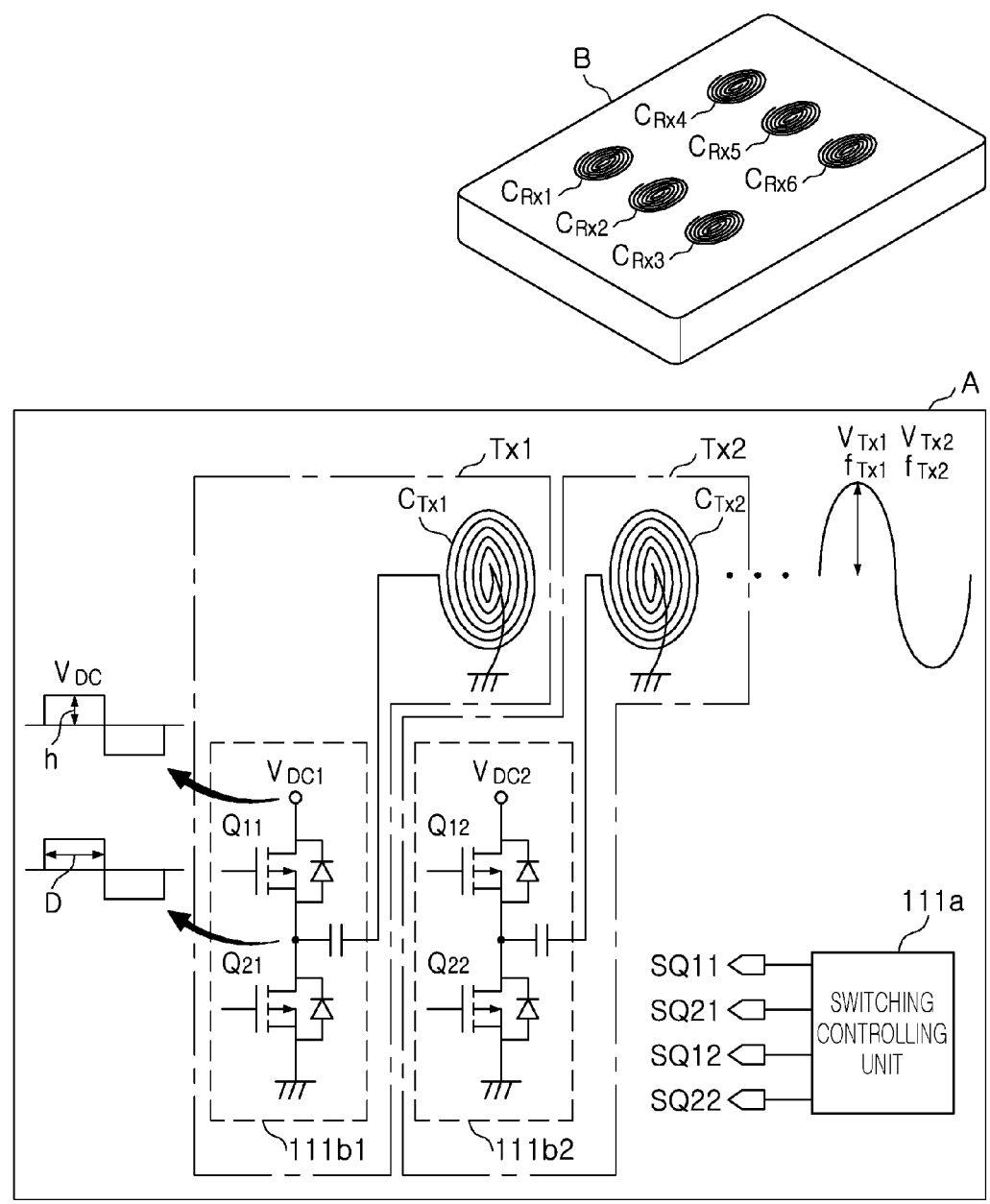
FIG. 11 is a circuit diagram schematically illustrating an example of a control of a voltage transmitted from a power charging apparatus to a battery apparatus according to an exemplary embodiment of the present disclosure.

FIG. 11 is a circuit diagram schematically illustrating a control of a voltage transmitted from a power charging apparatus to a battery apparatus according to an exemplary embodiment of the present disclosure.

Referring to FIG. 11, the power transmitting units Tx1 and Tx2 of the power charging apparatus A may include power transmitting coils $C_{Tx1}$ and $C_{Tx2}$ and switching units 111*b*1 and 111*b*2. The switching units 111*b*1 and 111*b*2 may transfer power to the power transmitting coils $C_{Tx1}$ and $C_{Tx2}$, respectively, in order to calculate the coupling coefficients between the power transmitting side and the power receiving side as described above.

The respective switches Q11, Q21, Q12, and Q22 of the switching units 111*b*1 and 111*b*2 may switch driving power $V_{DC1}$ and $V_{DC2}$ depending on switching control signals SQ11, SQ21, SQ12, and SQ22 from the switching controlling unit 111*a* to transfer the power to the outside through the corresponding power transmitting coils $C_{Tx1}$ and $C_{Tx2}$ in a non-contact scheme.

The switching controlling unit 111*a* may control power switching of the switching units 111*b*1 and 111*b*2 depending on information of the battery apparatus B transferred from the communicating unit 111*c*. For example, the switching controlling unit 111*a* may control switching duties or on-off down times of the respective switches Q11, Q21, Q12, and Q22 to adjust the voltage levels $V_{Tx1}$ and $V_{Tx2}$ of the power output through the power transmitting coils CTx1 and CTx2, control voltage levels of the driving power $V_{DC1}$ and $V_{DC2}$ to adjust the voltage levels $V_{Tx1}$ and $V_{Tx2}$ of the power output through the power transmitting coils CTx1 and CTx2, or control switching frequencies to control frequencies $f_{Tx1}$ and $f_{Tx2}$ at which the power are transmitted through the power transmitting coils CTx1 and CTx2.

The above-mentioned adjusting or controlling operation may be performed based on the coupling coefficients between the power transmitting side and the power receiving side.

As an example, in the case in which the coupling coefficient between the first power transmitting coil $C_{Tx1}$ and the first power receiving coil $C_{Rx1}$ is low, the first power transmitting unit Tx1 may control the switching frequencies of the respective switches Q11 and Q21 of the switching unit 111*b*1 to control the frequency $f_{Tx1}$ at which the power is transmitted through the power transmitting coil CTx1, in order to effectively control the power transferred to the first power receiving coil CRx1.

As another example, in the case in which the coupling coefficient between the second power transmitting coil $C_{Tx2}$ and the second power receiving coil $C_{Rx2}$ is high, the second power transmitting unit Tx2 may control the switching duties or the on-off down times of the respective switches Q12 and Q22 of the switching unit 111*b*2 to adjust the voltage level $V_{Tx2}$ of the power output through the power transmitting coil $C_{Tx2}$ or control the voltage level of the driving power $V_{DC2}$ to adjust the voltage level $V_{Tx2}$ of the power output through the power transmitting coil CTx2, thereby controlling the power transferred to the second power receiving coil $C_{Rx2}$.

Since the information on the position, the power charging state, the operating state, the charging power, and the like, of the battery apparatus B is continuously needed for the power charging of the power charging apparatus A, the information may be transferred by the bidirectional communications between the communicating unit 111*c* of the power charging apparatus A and the communicating unit Com of the battery apparatus B. In addition, the information on the positions, the power transmitting states, the power switching operations, the power, and the like, of the power transmitting coils $C_{Tx1}$ and $C_{Tx2}$ of the power charging apparatus A may be transferred to the battery apparatus B through the communicating unit Com of the battery apparatus B.

Figure 12:
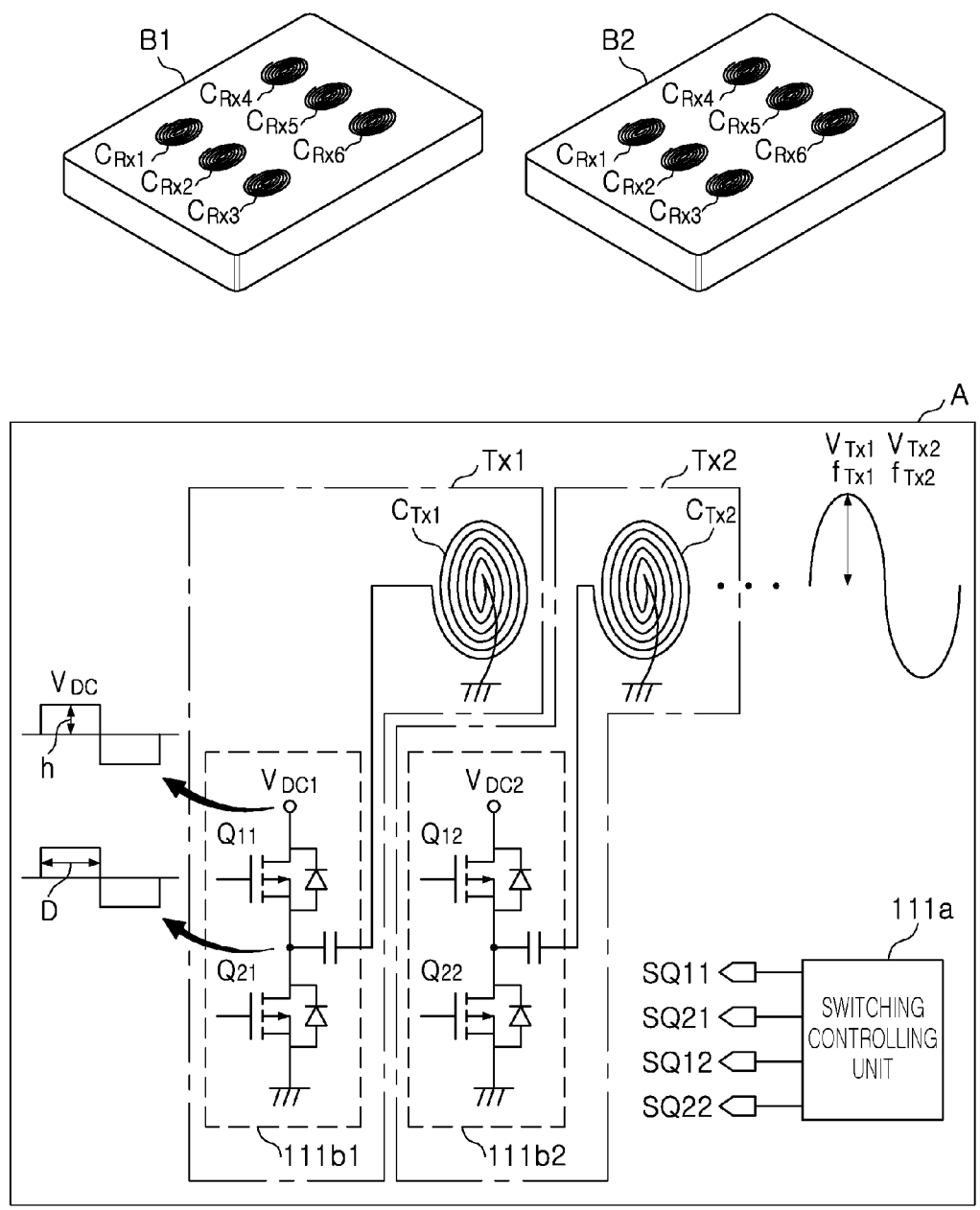
FIG. 12 is a circuit diagram schematically illustrating an example of a control of power transmitted from a power charging apparatus to a plurality of battery apparatuses according to an exemplary embodiment of the present disclosure.

FIG. 12 is a circuit diagram schematically illustrating a control of power transmitted from a power charging apparatus to a plurality of battery apparatuses according to an exemplary embodiment of the present disclosure.

Referring to FIG. 12, the power charging apparatus A according to an exemplary embodiment of the present disclosure may transmit the power to the plurality of battery apparatuses B1 and B2 in the non-contact scheme.

Each of the battery apparatuses B1 and B2 may include at least one or a plurality of power receiving coils, for example, six power receiving coils $C_{Rx1}$, $C_{Rx2}$, $C_{Rx3}$, $C_{Rx4}$, $C_{Rx5}$, and $C_{Rx6}$.

Similar to FIG. 11, the power transmitting units Tx1 and Tx2 of the power charging apparatus A may include power transmitting coils $C_{Tx1}$ and $C_{Tx2}$ and switching units 111*b*1 and 111*b*2. The switching units 111*b*1 and 111*b*2 may transfer power to the power transmitting coils $C_{Tx1}$ and $C_{Tx2}$, respectively, in order to calculate the coupling coefficients between the power transmitting side and the power receiving side.

The respective switches Q11, Q21, Q12, and Q22 of the switching units 111*b*1 and 111*b*2 may switch the driving power $V_{DC1}$ and $V_{DC2}$ depending on the switching control signals SQ11, SQ21, SQ12, and SQ22 from the switching controlling unit 111*a* to transfer the power to the outside through the corresponding power transmitting coils $C_{Tx1}$ and $C_{Tx1}$ in the non-contact scheme.

The switching controlling unit 111*a* may control the power switching of the switching units 111*b*1 and 111*b*2 depending on the transferred information of the battery apparatus B. For example, the switching controlling unit 111*a* may control the switching duties or the on-off down times of the respective switches Q11, Q21, Q12, and Q22 to adjust the voltage levels $V_{Tx1}$ and $V_{Tx2}$ of the power output through the power transmitting coils $C_{Tx1}$ and $C_{Tx2}$, control the voltage levels of the driving power $V_{DC1}$ and $V_{DC2}$ to adjust the voltage levels $V_{Tx1}$ and $V_{Tx2}$ of the power output through the power transmitting coils $C_{Tx1}$ and $C_{Tx2}$, or control the switching frequencies to control the frequencies $f_{Tx1}$ and $f_{Tx2}$ at which the powers are transmitted through the power transmitting coils $C_{Tx1}$ and $C_{Tx2}$.

The above-mentioned adjusting or controlling operation may be performed based on the coupling coefficients between the power transmitting side and the power receiving side.

As an example, in the case in which the coupling coefficient between the first power transmitting coil $C_{Tx1}$ and a first power receiving coil $C_{Rx1}$ of a first battery apparatus B1 is low, the first power transmitting unit Tx1 may control the switching frequencies of the respective switches Q11 and Q21 of the switching unit 111*b*1 to control the frequency $f_{Tx1}$ at which the power is transmitted through the power transmitting coil $C_{Tx1}$, in order to effectively control the power transferred to the first power receiving coil $C_{Rx1}$ of the first battery apparatus B1.

As another example, in the case in which the coupling coefficient between the second power transmitting coil $C_{Tx2}$ and a second power receiving coil $C_{Rx2}$ of a second battery apparatus B2 is high, the second power transmitting unit Tx2 may control the switching duties or the on-off down times of the respective switches Q12 and Q22 of the switching unit 111b2 to adjust the voltage level $V_{Tx2}$ of the power output through the power transmitting coil $C_{Tx2}$ or control the voltage level of the driving power $V_{DC2}$ to adjust the voltage level $V_{Tx2}$ of the power output through the power transmitting coil $C_{Tx2}$, thereby controlling the power transferred to the second power receiving coil $C_{Rx2}$ of the second battery apparatus B2.

In addition, each of the first and second power transmitting units Tx1 and Tx2 may be controlled to transmit the power to the first battery apparatus B1 at a first frequency, for example, a frequency of approximately 100 to 300 KHz of a wireless power consortium (WPC) standard and to transmit the power to the second battery apparatus B2 at a second frequency that is relatively high, for example, a frequency of 6.78 MHz of an alliance for wireless power (A4WP) standard.

In addition, the power may be transmitted to the first power receiving coil $C_{Rx1}$ of the first battery apparatus B1 at the frequency of the WPC standard and be transmitted to the second power receiving coil $C_{Rx2}$ of the first battery apparatus B1 at the frequency of the A4WP standard.

Since information on positions, power charging states, operating states, power, and the like, of the battery apparatuses B1 and B2 is continuously needed for the power charging of the power charging apparatus A, the information may be transferred by bidirectional communications between the power charging apparatus A and the battery apparatuses B1 and B2. In addition, the information on the positions, the power transmitting states, the power switching operations, the power, and the like, of the power transmitting coils $C_{Tx1}$ and $C_{Tx2}$ of the power charging apparatus A may be transferred to the battery apparatuses B1 and B2.

FIGS. 13A through 13D are views illustrating an example of a switching control of an active rectifier in a battery apparatus according to an exemplary embodiment of the present disclosure.

Figure 13A:
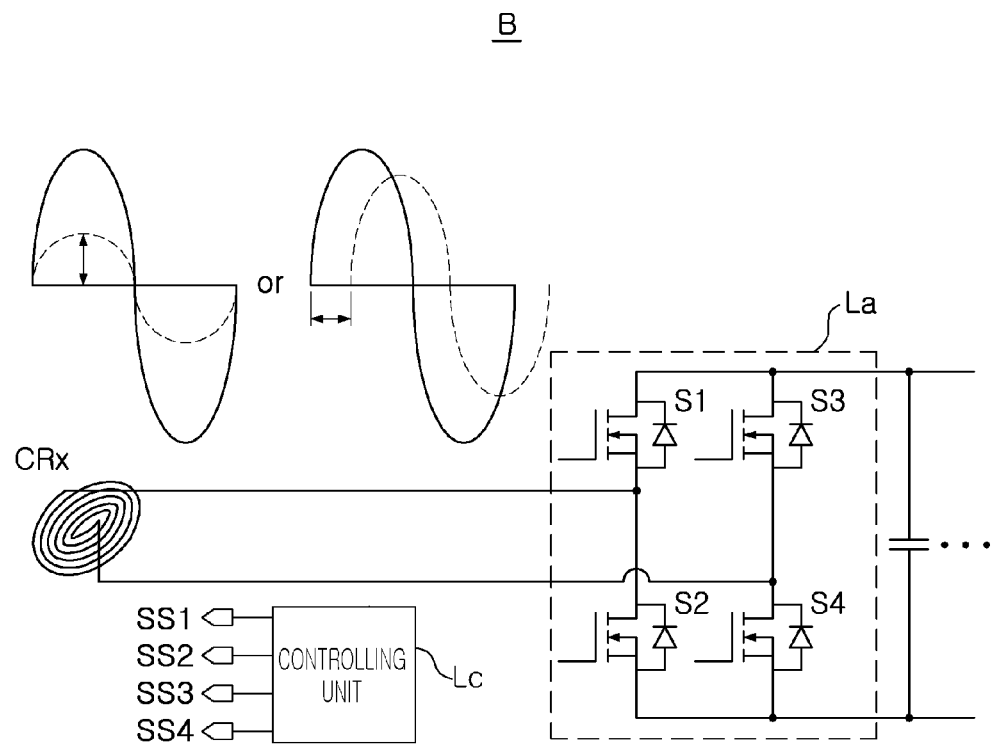
FIGS. 13A through 13D are views illustrating an example of a switching control of an active rectifier in a battery apparatus according to an exemplary embodiment of the present disclosure.

Referring to FIG. 13A, the battery apparatus B according to an exemplary embodiment of the present disclosure may receive the power transmitted in the non-contact scheme through the power receiving coil CRx. Here, a phase difference or a level difference may be generated between a voltage and a current of the received power, such that power efficiency may be deteriorated.

The battery apparatus B according to an exemplary embodiment of the present disclosure may include an active type rectifying unit La.

The rectifying unit La may include, for example, but not limited to, four switches S1, S2, S3, and S4 connected to each other in a full bridge scheme.

A controlling unit Lc may provide gate signals SS1, SS2, SS3, and SS4 to control a switching operation of the rectifying unit La. For instance, the controlling unit Lc may control the switching in a pulse width modulation (PWM) scheme.

Figure 13B:
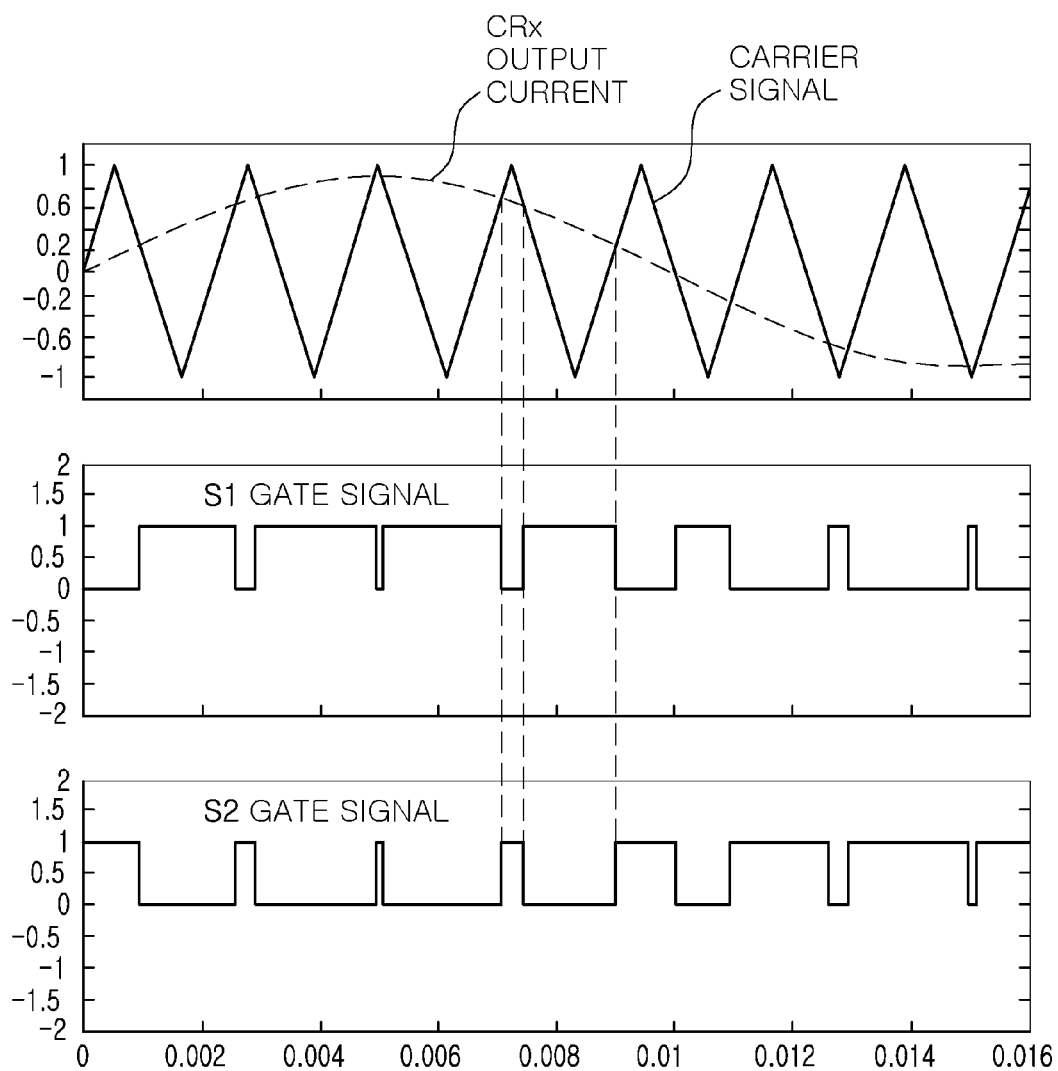
Figure 13C:
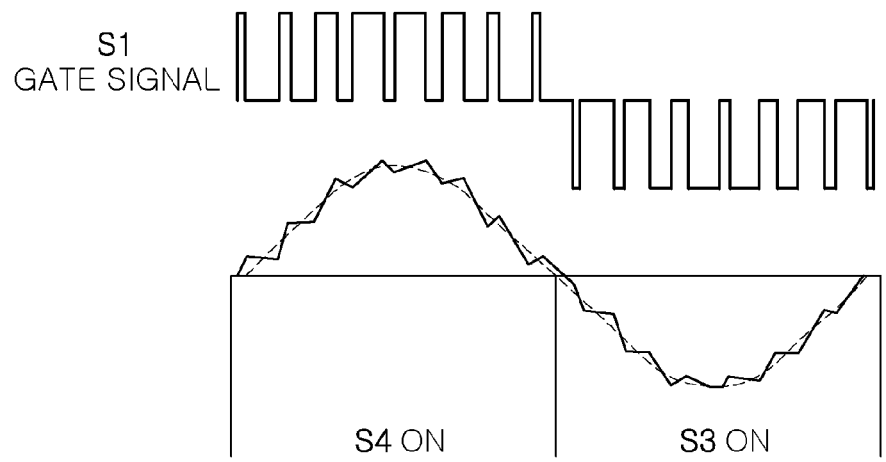

For example, as shown in FIG. 13B, the controlling unit Lc may compare a carrier signal having a frequency higher than a transmission frequency of the power transmitted in the non-contact scheme and an output current of the power receiving coil CRx with each other to provide gate signals of the first and second switches S1 and S2. In this case, the third and fourth switches S3 and S4 may each be turned on during each half period of the power transmitted in the non-contact scheme, as shown in FIG. 13C. For example, the fourth switch S4 may be turned on during a positive half period of the power transmitted in the non-contact scheme, and the third switch S3 may be turned on during a negative half period of the power transmitted in the non-contact scheme.

Figure 13D:
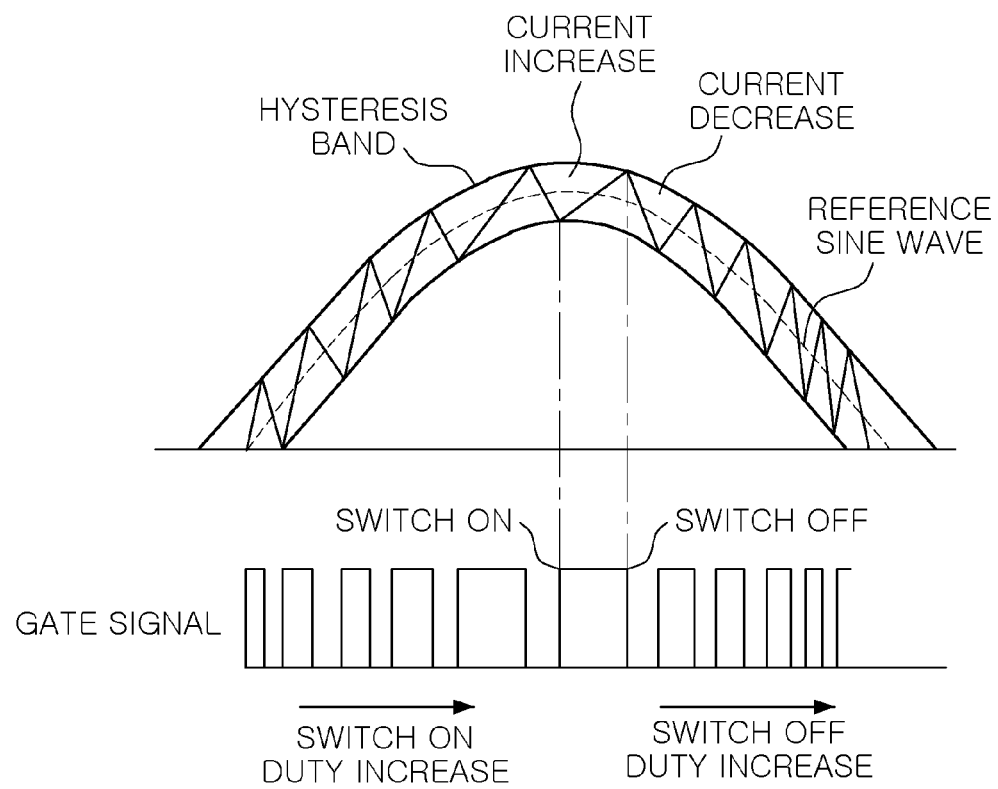

Referring to FIG. 13D, a reference signal of the output current of the power receiving coil CRx, required for controlling the output current of the power receiving coil CRx may be controlled using a hysteresis band such as an interval between an upper limit and a lower limit of the output current of the power receiving coil CRx.

When a width of the above-mentioned hysteresis band is decreased, a ripple of the output current of the power receiving coil CRx may be decreased, such that the output current of the power receiving coil CRx may be precisely controlled; however, switching frequencies of the switches S1, S2, S3, and S4 of the rectifying unit La may be increased, such that power loss may be increased.

As set forth above, according to some exemplary embodiments of the present disclosure, amounts of transmitted power may be adjusted for each of the battery cells depending on the coupling coefficients between the power transmitting coils and the power receiving coils to maintain the power balance between the battery cells or charge the respective battery cells with maximum allowable power charging currents, thereby rapidly charging the battery cells with the power. In addition, levels of power each transmitted to the plurality of battery apparatuses including at least one battery cell may be adjusted to maintain a power balance between the battery apparatuses or charge the respective battery apparatuses with maximum allowable power charging currents, thereby rapidly charging the power in the battery apparatuses.

While exemplary embodiments have been shown and described above, it will be apparent to those skilled in the art that modifications and variations could be made without departing from the scope of the present invention as defined by the appended claims.

What is claimed is:

1. A non-contact type power charging apparatus comprising:
   power transmitting coils transmitting power in a non-contact scheme;
   switching units connected to the power transmitting coils to switch the power transmitted through corresponding power transmitting coils; and
   a switching controlling unit controlling power switching of the switching units depending on coupling coefficients between each of the power transmitting coils and a power receiving coil of battery apparatuses receiving the power from the power transmitting coils to charge the power in a battery cell,
   wherein each of the battery apparatuses comprises multiple power receiving coils and multiple battery cells, and
   wherein each of the power receiving coils, of each of the battery apparatuses, corresponds to each of the battery cells of the same battery apparatus among each of the battery apparatuses, in a one-to-one scheme.

2. The non-contact type power charging apparatus of claim 1, wherein the switching controlling unit controls at least one or more of voltage levels, switching duties, switching on-off down times, and switching frequencies of the power input to each of the switching units.

3. The non-contact type power charging apparatus of claim 2, wherein the switching controlling unit differently controls the at least one or more of the voltage levels, the switching duties, the switching on-off down times, and the switching frequencies of the power input to each of the switching units.

4. The non-contact type power charging apparatus of claim 1, wherein the switching controlling unit selectively operates one of the power transmitting coils to set coupling coefficients between the corresponding power transmitting coil and power receiving coils.

5. The non-contact type power charging apparatus of claim 1, wherein the switching controlling unit selectively varies transmission power of one of the power transmitting coils to set coupling coefficients between the corresponding power transmitting coil and power receiving coils.

6. The non-contact type power charging apparatus of claim 1, further comprising:
   a communicating unit configured to receive information on the power received from an outside of the power charging apparatus, wherein the switching controlling unit sets the coupling coefficients based on the information on the power from the communicating unit.

7. A non-contact type power charging apparatus comprising:
   power transmitting units each comprising:
      a power unit configured to supply a direct current (DC) voltage,
      a switching unit configured to switch the DC voltage from the power unit,
      a power transmitting coil transmitting power in a non-contact scheme depending on power switching of the switching unit, a detecting unit detecting power state variations of the power transmitting coil, and
      a controlling unit configured to control the power switching of the switching unit by setting a coupling coefficient between the power transmitting coil and a power receiving coil depending on a detection result of the detecting unit,
   wherein the power transmitting units control transmission power depending on coupling coefficients between the power transmitting coils of each of the power transmitting units and a power receiving coil of battery apparatuses receiving the power from the power transmitting coils to charge the power in a battery cell,
   wherein each of the battery apparatuses comprises multiple receiving coils and multiple battery cells, and
   wherein each of the power receiving coils, of each of the battery apparatuses, corresponds to each of the battery cells of same battery apparatus among each of the battery apparatuses, in a one-to-one scheme.

8. The non-contact type power charging apparatus of claim 7, wherein at least one or more of voltage levels, switching duties, switching on-off down times, and switching frequencies of powers input to each of the switching unit of the power transmitting units are controlled.

9. The non-contact type power charging apparatus of claim 7, wherein one of the power transmitting units is selectively operated to calculate the coupling coefficients between a corresponding power transmitting coil and power receiving coils.

10. The non-contact type power charging apparatus of claim 7, wherein the transmission power of one of the power transmitting units is selectively varied to calculate the coupling coefficients between a corresponding power transmitting coil and power receiving coils.

11. The non-contact type power charging apparatus of claim 7, wherein the detecting unit detects a power state of the power transmitting coil varied depending on power state variations of each of power receiving coils receiving the power from the power transmitting coil.

* * * * *